United States Patent
Yang

(10) Patent No.: US 10,262,623 B2
(45) Date of Patent: Apr. 16, 2019

(54) METHODS OF OPERATING APPLICATION PROCESSORS AND DISPLAY SYSTEMS WITH DISPLAY REGIONS HAVING NON-RECTANGULAR SHAPES

(71) Applicant: Samsung Electronics Co., Ltd., Suwon-si, Gyeonggi-do (KR)

(72) Inventor: Seung-soo Yang, Hwaseong-si (KR)

(73) Assignee: Samsung Electronics CO., LTD., Gyeonggi-Do (KR)

( * ) Notice: Subject to any disclaimer, the term of this patent is extended or adjusted under 35 U.S.C. 154(b) by 101 days.

(21) Appl. No.: 15/290,265

(22) Filed: Oct. 11, 2016

(65) Prior Publication Data
US 2017/0110085 A1   Apr. 20, 2017

(30) Foreign Application Priority Data

Oct. 16, 2015   (KR) .................. 10-2015-0144743

(51) Int. Cl.
| | | |
|---|---|---|
| G09G 5/00 | (2006.01) | |
| H04N 7/01 | (2006.01) | |
| G06T 1/60 | (2006.01) | |
| G09G 3/20 | (2006.01) | |
| G09G 5/393 | (2006.01) | |
| G09G 5/395 | (2006.01) | |

(52) U.S. Cl.
CPC ............. *G09G 5/005* (2013.01); *G06T 1/60* (2013.01); *G09G 3/2092* (2013.01); *G09G 5/393* (2013.01); *G09G 5/395* (2013.01); *H04N 7/0122* (2013.01); *G09G 5/006* (2013.01); *G09G 2310/0264* (2013.01); *G09G 2370/04* (2013.01)

(58) Field of Classification Search
None
See application file for complete search history.

(56) References Cited

U.S. PATENT DOCUMENTS

| | | |
|---|---|---|
| 3,893,289 A | 7/1975 | Giger et al. |
| 6,894,706 B1 | 5/2005 | Ward et al. |
| D518,966 S | 4/2006 | Sakaguchi |
| 8,350,791 B2 | 1/2013 | Takahashi et al. |
| 8,704,814 B2 | 4/2014 | Yen |
| 8,717,391 B2 | 5/2014 | Bratt et al. |
| 2005/0024524 A1 | 2/2005 | Yourlo et al. |
| 2009/0021532 A1* | 1/2009 | Gloege ............... H04N 7/0122 345/647 |
| 2011/0141025 A1 | 6/2011 | Tsai |
| 2012/0005563 A1 | 1/2012 | Gloege et al. |
| 2013/0137493 A1 | 5/2013 | Torkkel |

(Continued)

FOREIGN PATENT DOCUMENTS

| | | |
|---|---|---|
| CN | 101078826 A | 11/2007 |
| CN | 102647512 A | 8/2012 |

(Continued)

*Primary Examiner* — Joni Richer
(74) *Attorney, Agent, or Firm* — Harness, Dickey & Pierce, P.L.C.

(57) ABSTRACT

In a method of operating an application processor to control a display device including a non-rectangular valid display region, screen information regarding the non-rectangular valid display region is received, and a plurality of pieces of valid pixel data selected based on the screen information and corresponding to the non-rectangular valid display region are output to the display device.

20 Claims, 22 Drawing Sheets

(56) References Cited

U.S. PATENT DOCUMENTS

2015/0046674 A1  2/2015  Barry et al.
2016/0189601 A1* 6/2016  Jung ..................... G09G 3/20
                                                    345/212

FOREIGN PATENT DOCUMENTS

| EP | 2600261 A2 | 6/2013 |
| JP | 08-006532 A | 1/1996 |
| JP | 08-034324 A | 2/1996 |
| KR | 20060037694 A | 5/2006 |

* cited by examiner

FIG. 8A

| Line | Offset | Length |
|------|--------|--------|
| R0   | 3      | 1      |
| R1   | 2      | 3      |
| R2   | 1      | 5      |
| ⋮    |        |        |
| R6   | 3      | 1      |

FIG. 8B

| Line | Offset1 | Length1 | Offset2 | Length2 |
|------|---------|---------|---------|---------|
| R0   | 3       | 1       | –       | –       |
| R1   | 2       | 3       | –       | –       |
| R2   | 1       | 2       | 4       | 2       |
| ⋮    |         |         |         |         |
| R6   | 3       | 1       | –       | –       |

|  | UL | Offset | Length |
|---|---|---|---|
| UP1 | R1 | 4 | 1 |
| UP2 | R2 | 4 | 2 |

METHODS OF OPERATING APPLICATION PROCESSORS AND DISPLAY SYSTEMS WITH DISPLAY REGIONS HAVING NON-RECTANGULAR SHAPES

CROSS-REFERENCE TO RELATED APPLICATION

This application claims priority under 35 U.S.C. § 119 to Korean Patent Application No. 10-2015-0144743, filed on Oct. 16, 2015, in the Korean Intellectual Property Office, the disclosure of which is incorporated herein in its entirety by reference.

BACKGROUND

Field

Example embodiments relate to semiconductor devices, and more particularly, to methods of operating application processors to display images on display panels, and display systems including the same.

Description of Related Art

Electronic devices having an image display function (e.g., computers, tablet personal computers (PCs), smart phones, and wearable electronic devices) include a display system. The display system includes a display panel, a display driver (or a display driver integrated circuit (DDI)), and a processor. The display panel includes a plurality of pixels and may be embodied as a flat panel display, such as a liquid crystal display (LCD) or an organic light emitting diode (OLED), or a flexible display. As electronic devices to which the display system is applicable have been diversified, screens of display panels also have been diversified in shape, and thus, images are being displayed on screens having various shapes.

SUMMARY

At least some example embodiments provide methods of operating application processors capable of more efficiently driving display panels having screens of various shapes in terms of power consumption and/or performance. At least some example embodiments provide display systems including application processors.

According to at least one example embodiment, a method of operating an application processor configured to control a display device including a non-rectangular valid display region includes: receiving screen information regarding the non-rectangular valid display region; and outputting a plurality of pieces of valid pixel data to the display device, the plurality of pieces of valid pixel data selected based on the screen information, and the plurality of pieces of valid pixel data corresponding to the valid display region.

According to at least one other example embodiment, a display system includes: a display panel configured to display an image in a valid display region; an application processor; and a display driver. The application processor is configured to: receive screen information associated with the valid display region; and, based on the screen information, pack a plurality of pieces of valid pixel data, and output the plurality of pieces of packed valid pixel data. The plurality of pieces of valid pixel data corresponds to valid image data to be displayed in the valid display region. The display driver integrated circuit (IC) is configured to: restore the valid image data by unpacking the plurality of pieces of valid pixel data received from the application processor; and drive the display panel based on the valid image data.

At least one other example embodiment provides a method of operating an application processor to control a display device including a valid display region having a non-rectangular shape, the method comprising: receiving screen information associated with the valid display region; and outputting a plurality of pieces of valid pixel data, the plurality of pieces of valid pixel data selected based on the screen information and corresponding to the valid display region of the display device.

According to at least some example embodiments, the screen information may include a starting position of the valid display region and a number of pixels arranged continuously from the starting position in each of a plurality of lines of a display panel of the display device. The plurality of lines may be horizontal or vertical lines.

The valid display region may include at least two lines. Each of the at least two lines may include a different number of valid pixels, and the at least two lines may be horizontal or vertical lines.

The outputting a plurality of pieces of valid pixel data may include: packing the plurality of pieces of valid pixel data; writing the packed plurality of pieces of valid pixel data to a memory; and outputting the packed plurality of pieces of valid pixel data from the memory to the display device.

The writing the packed plurality of pieces of valid pixel data to a memory may include: writing, from among the packed plurality of pieces of valid pixel data; valid pixel data corresponding to at least two lines of the valid display region to at least one row or column of the memory, the at least two lines being horizontal or vertical lines of the valid display region.

The packing the plurality of pieces of valid pixel data may include: arranging the plurality of pieces of valid pixel data into units, each of the units including pixel data corresponding to a plurality of pixels.

The writing may write a first number of the packed plurality of pieces of valid pixel data to the memory; and the outputting may output the first number of the packed plurality of pieces of valid pixel data to the display device.

The outputting a plurality of pieces of valid pixel data may include: generating rectangular image data; storing the rectangular image data in a memory; selectively reading, based on the screen information, the plurality of pieces of valid pixel data from among the rectangular image data stored in the memory, the plurality of pieces of valid pixel data corresponding to the valid display region; and outputting the selectively read plurality of pieces of valid pixel data to the display device.

The method may further include: identifying valid pixel data corresponding to a portion of the valid display region to be updated; and outputting the identified valid pixel data and location information of the portion of the valid display region to the display device.

At least one other example embodiment provides a display system comprising: a display panel configured to display an image in a valid display region; an application processor; and a display driver circuit. The application processor is configured to execute computer readable instructions such that the application processor is configured to: receive screen information associated with the valid display region; pack a plurality of pieces of valid pixel data, the plurality of pieces of valid pixel data corresponding to valid image data to be displayed in the valid display region, and the valid image data based on the screen information; and output the packed plurality of pieces of valid pixel data. The display driver circuit is configured to: restore the valid image data by unpacking the packed plurality of pieces of valid pixel data received from the application processor; and drive the display panel based on the restored valid image data.

The application processor may be configured to execute the computer readable instructions such that the application processor is further configured to: generate the valid image data based on the screen information; and write the packed plurality of pieces of valid pixel data to a memory.

The display system may further include a memory. The application processor may be configured to execute the computer readable instructions such that the application processor is further configured to write the packed plurality of pieces of valid pixel data to the memory.

The display driver circuit may include: a graphics memory configured to store the packed plurality of pieces of valid pixel data. The display driver circuit may be further configured to rearrange the packed plurality of pieces of valid pixel data to correspond to the valid display region.

The application processor may be configured to execute the computer readable instructions such that the application processor is further configured to: identify valid pixel data corresponding to a portion of the valid display region to be updated; and output the identified valid pixel data and location information of the portion of the valid display region to the display driver circuit.

The valid display region may have a non-rectangular shape including one of a round shape, an oval shape, an N-polygonal shape, and a curved shape, wherein N denotes an integer which is greater than or equal to 3.

At least one other example embodiment provides a display system comprising: a display panel having a display region configured to display at least one image, the display region having a non-rectangular shape; and a display driver integrated circuit configured to drive the display panel based on valid pixel data corresponding to only a portion of a rectangular-shaped image, the portion of the rectangular-shaped image having the same non-rectangular shape as the display region.

The display driver integrated circuit may be further configured to: output screen information indicative of the non-rectangular shape of the display region; and receive the valid pixel data in response to the screen information.

The display system may further include: a memory storing computer readable instructions; and processing circuitry. The processing circuitry may be configured to execute the computer readable instructions such that the processing circuitry is configured to: generate the valid pixel data based on the screen information; and output the valid pixel data to the display driver integrated circuit.

The screen information may identify a portion of the display panel as the display region.

The display driver integrated circuit may be further configured to: receive the valid pixel data; generate valid image data by rearranging the valid pixel data; and output the valid image data to drive the display panel.

BRIEF DESCRIPTION OF THE DRAWINGS

Example embodiments of inventive concepts will be more clearly understood from the following detailed description taken in conjunction with the accompanying drawings in which:

FIGS. 8A and 8B are diagrams illustrating example screen information according to example embodiments;

FIG. 14A illustrates example pixels to be partially updated in a valid display region;

FIG. 14B illustrates example location information of pixels to be updated;

DETAILED DESCRIPTION

Figure 1:
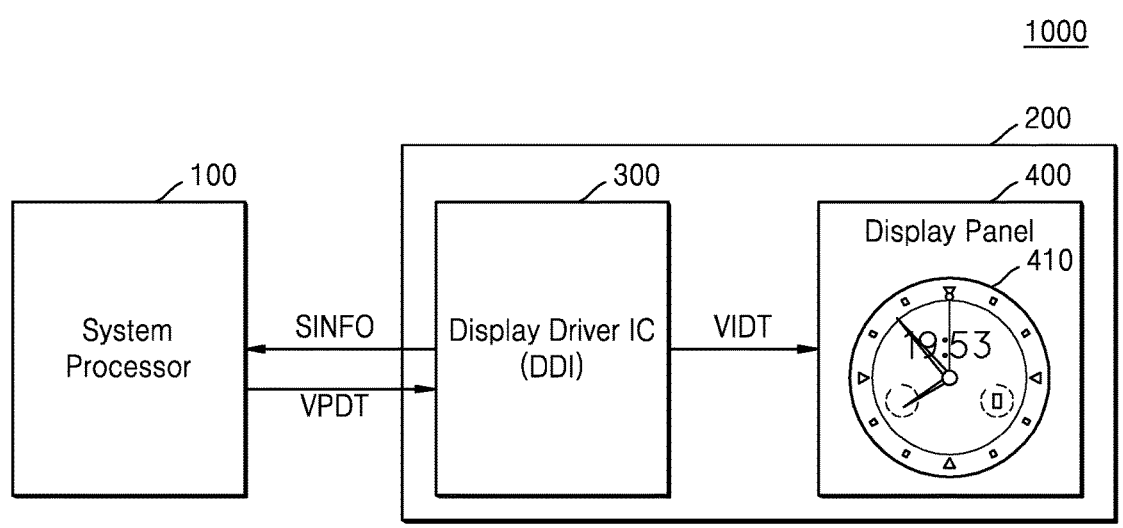
FIG. 1 is a block diagram of a display system according to an example embodiment.

Hereinafter, various example embodiments will be described in conjunction with the accompanying drawings. Various changes may be made in these example embodiments and inventive concepts may be accomplished in various embodiments. Thus, example embodiments are illustrated in the drawings and described in detail herein. However, inventive concepts are not limited to these example embodiments, and these example embodiments should be understood as covering all modifications, equivalents, and alternatives falling within the scope of inventive concepts. In the drawings, the same reference numerals are assigned to the same or corresponding elements.

In the present disclosure, it will be understood that the terms 'comprise' and/or 'may comprise,' are used to indicate a function, an operation, or an element and thus at least one additional function, operation, element, or the like is not limited by the terms. It will be further understood that the terms 'comprise' and/or 'comprising,' specify the presence of stated features, integers, steps, operations, elements, and/or components, but do not preclude the presence or addition of one or more other features, integers, steps, operations, elements, components, and/or groups thereof.

It will be understood that although the terms 'first', 'second', etc. may be used herein to describe various components, these components should not be limited by these terms. These components are only used to distinguish one component from another.

The term 'and/or' includes any and all combinations of one or more of the associated listed items. For example, 'A and/or B' should be understood to mean A, B, or both of A and B.

It will be understood that, although the terms 'first', 'second', 'third', etc., may be used herein to describe various elements, components, regions, layers and/or sections, these elements, components, regions, layers and/or sections should not be limited by these terms. For example, an order and/or importance of elements are not limited by these terms. These terms are only used to distinguish one element, component, region, layer or section from another region, layer or section. For example, a first user device and a second user device are merely user devices and should be understood to represent different user devices. Thus, a first element, component, region, layer or section discussed below could be termed a second element, component, region, layer or section without departing from the teachings of inventive concepts.

It will be understood that when an element or layer is referred to as being 'coupled to' or 'connected to' another element or layer, the element or layer can be directly coupled or connected to another element or layer or intervening elements or layers may be present there between. In contrast, when an element or layer is referred to as being 'directly coupled to' or 'directly connected to' another element or layer, there are no intervening elements or layers present.

The terminology used herein is for the purpose of describing particular embodiments only and is not intended to be limiting of various example embodiments. As used herein, the singular forms 'a', 'an' and 'the' are intended to include the plural forms as well, unless the context clearly indicates otherwise.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices (e.g., image generator, packer, display controller, etc., as described herein) discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices (e.g., image generator, packer, display controller, etc., as described herein) according to one or more example embodiments may be implemented using hardware, software, and/or a combination thereof. For example, hardware devices may be implemented using processing circuitry such as, but not limited to, a processor, an application processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, application processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted, by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices (e.g., image generator, packer, display controller, etc., as described herein) according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device or application processor, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

In various example embodiments, the term 'display system' may be understood as an electronic device having an image display function. For example, the electronic device may be understood to include at least one among a smart phone, a tablet personal computer (PC), a mobile phone, a video telephone, an e-book reader, a desktop PC, a laptop PC, a netbook computer, a personal digital assistant (PDA), a portable multimedia player (PMP), an MP3 player, a mobile medical device, a camera, and a wearable device, e.g., a head-mounted-device (HMD) such as electronic glasses, electronic clothes, an electronic bracelet, an electronic necklace, an electronic appcessory, an electronic tattoo, or a smart watch.

In some example embodiments, the term 'display system' may be understood as a smart home appliance having an image display function. For example, the smart home appliance may be understood to include at least one among a television (TV), a digital video disk (DVD) player, an audio system, a refrigerator, an air conditioner, a vacuum, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic picture frame, etc.

In some example embodiments, the term 'display system' may be understood to include at least one among various medical devices (e.g., a magnetic resonance angiography (MRA) device, a magnetic resonance imaging (MRI) device, a computed tomography (CT) device, a photography device, an ultrasonic device, etc.), a navigation device, a global positioning system (GPS) receiver, an event data recorder (EDR), a flight data recorder (FDR), a vehicle infotainment device, an electronic device for use in a vessel (e.g.: a navigation device for a vessel, a gyrocompass, etc.), an electronic avionics device, a security device, a head unit for a vehicle, an industrial or household robot, an automatic teller's machine (ATM) of a banking organization, a point of sales (POS) of a shop, etc.

In some example embodiments, the term 'display system' may be understood to include at least one among furniture having an image display function, a part of a building/structure, an electronic board, an electronic signature receiving device, a projector, and various measuring devices (e.g., water, electric, gas, or radio wave measuring device, etc.). In various example embodiments, an electronic device including a display system may be understood to include at least one among the various devices described above and a combination thereof. Also, the term 'display system' may be understood as a flexible device. It would be obvious to those of ordinary skill that display systems according to various example embodiments are not limited to the devices described above.

Display systems according to various example embodiments will now be described with reference to the accompanying drawings. In various example embodiments, the term 'user' may be understood as a human being who uses a display system or a device that uses a display system, e.g., an artificial intelligence electronic device.

As used herein, expressions such as 'at least one of,' when preceding a list of elements, modify the entire list of elements and do not modify the individual elements of the list.

FIG. 1 is a block diagram of a display system 1000 according to an example embodiment.

Referring to FIG. 1, the display system 1000 may include a system processor 100 and a display device 200. The display system 1000 may further include other elements, e.g., a camera interface, an external memory, etc. In one example embodiment, the system processor 100 and a display driver integrated circuit (IC) 300 may be embodied as separate semiconductor chips. Alternatively, the display system 1000 may be embodied as one module, one system-on-chip (SoC), or one package such as a multi-chip package.

The system processor 100 may control overall operations of the display system 1000, and particularly, the display device 200.

The system processor 100 may provide the display device 200 with image data to be displayed on a display panel 400. In this case, the system processor 100 may receive screen information SINFO regarding a valid display region 410 (e.g., a screen for displaying an image) of the display panel 400. In one example embodiment, the valid display region 410 may have a non-rectangular shape and/or a shape different from the shape of the display device. The system processor 100 may provide the display driver IC 300 with pixel data of valid image data corresponding to the valid display region 410 (valid pixel data VPDT) based on the screen information SINFO regarding the valid display region 410 having the non-rectangular shape.

The system processor 100 may selectively transmit, as pixel data, the valid pixel data VPDT corresponding to the valid display region 410 to the display driver IC 300, based on the screen information SINFO.

The system processor 100 may be embodied as a printed circuit board (PCB), such as a motherboard, an integrated circuit (IC), a system-on-chip (SoC), or the like. The system processor 100 may be also referred to as an application processor, a multimedia processor, an integrated multimedia processor, etc.

The display device 200 may include the display driver IC 300 and the display panel 400.

The display driver IC 300 may be embodied as one or more semiconductor chips. In one example embodiment, the display driver IC 300 and the display panel 400 may be embodied as one module. The display driver IC 300 may be mounted on the display panel 400. In another example embodiment, the display driver IC 300 may be integrated on the same semiconductor chip as the system processor 100.

The display driver IC 300 may drive the display panel 400 according to signals provided from the system processor 100. For example, the display driver IC 300 may drive the display panel 400 based on image data transmitted from the system processor 100.

The display driver IC 300 may drive the display panel 400 based on valid image data VIDT transmitted from the system processor 100. The valid image data VIDT is image data corresponding to the valid display region 410 of the display panel 400. In one example embodiment, the display driver IC 300 may receive a plurality of pieces of valid pixel data VPDT, which constitute the valid image data VIDT from the system processor 100, and restore the plurality of pieces of the valid pixel data VPDT to the valid image data VIDT. The display driver IC 300 may provide the display panel 400 with an image signal corresponding to the valid image data VIDT.

The display panel 400 may include a plurality of pixels arranged in rows and columns, and display images in units of frames. The display panel 400 may be embodied as a liquid crystal display (LCD), a light emitting diode (LED) display, an organic LED (OLED) display, an active-matrix OLED (AMOLED) display, an electro-chromic display (ECD), a digital mirror device (DMD), an actuated mirror device (AMD), a grating light valve (GLV), a plasma display panel (PDP), an electro luminescent display (ELD), a vacuum fluorescent display (VFD), etc. Alternatively, the display panel 400 may be embodied as another type of flat panel display or flexible display.

The display panel 400 includes the valid display region 410. The valid display region 410 is a region that is actually displayed to (and/or seen by) a user and may be referred to as a screen. As described above, the valid display region 410 may have a non-rectangular shape. For example, the valid display region 410 may have any of various shapes, e.g., a round shape, an oval shape, a ring shape, a flat tire shape (e.g., a round shape having a flat portion), a polygonal shape, a shape having a curved side surface, etc. The valid display region 410 having the non-rectangular shape may include at least two horizontal or vertical lines each having a different number of valid pixels. In the display panel 400, an image may be displayed on the valid display region 410, based on an image signal output from the display driver IC 300, and corresponding to the valid image data VIDT.

Figure 2:
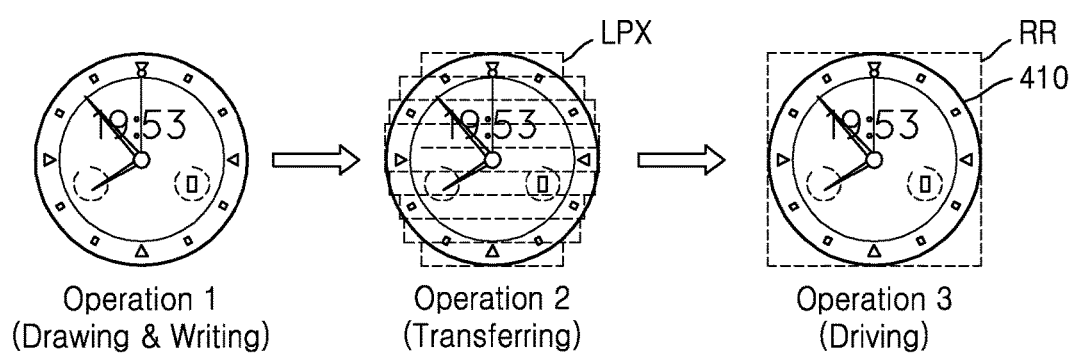
FIG. 2 is a conceptual diagram illustrating example operation of the display system of FIG. 1.

FIG. 2 is a conceptual diagram illustrating example operation of the display system 1000 of FIG. 1. For convenience of explanation, a case in which the valid display region 410 of the display panel 400 has a round shape will be described below.

Referring to FIG. 2, the display system 1000 may display an image on the valid display region 410, based on the valid image data VIDT corresponding to the valid display region 410 of the display panel 400.

In one example embodiment, the system processor 100 may generate the valid image data VIDT by drawing a valid image corresponding to the valid display region 410, and pack and write a plurality of pieces of valid pixel data included in the valid image data VIDT to a memory (not shown) (Operation 1). The packing of the plurality of pieces of valid pixel data refers to the sequentially arranging of the plurality of pieces of valid pixel data. When the plurality of pieces of valid pixel data are packed and written to the memory, the plurality of pieces of valid pixel data are sequentially written to rows or columns of the memory in units of lines LPX, so that an empty region (e.g., a region in which the valid pixel data is not stored) is not present between memory regions in which the plurality of pieces of valid pixel data are stored. A plurality of pieces of valid pixel data packed in units of a given (or, alternatively, desired or preset) number of pixels will be hereinafter referred to as 'packing data'.

The system processor 100 may transmit the plurality of pieces of valid pixel data to the display driver IC 300 (Operation 2). The system processor 100 may read, from the memory, the plurality of pieces of valid pixel data in the order in which the plurality of pieces of valid pixel data are packed, and sequentially output the plurality of pieces of valid pixel data in units of lines LPX in the order in which the plurality of pieces of valid pixel data are read.

The display driver IC 300 may drive the display panel 400 based on the valid image data VIDT by receiving a plurality of pieces of valid pixel data corresponding to image data of one frame and restoring the valid image data VIDT based on the plurality of pieces of valid pixel data (Operation 3).

In another example embodiment, the system processor 100 may generate rectangular image data including the valid image data VIDT, store the rectangular image data in the memory, output the plurality of pieces of valid pixel data corresponding to the valid image data VIDT from the memory, and transmit the plurality of pieces of valid pixel data to the display driver IC 300. The display driver IC 300 may drive the display panel 400, based on the valid image data VIDT restored based on the plurality of pieces of valid pixel data.

In another example embodiment, the system processor 100 may generate rectangular image data including the valid image data VIDT, and transmit the rectangular image data to the display driver IC 300. The display driver IC 300 may select only the plurality of pieces of valid pixel data corresponding to the valid image data VIDT among a plurality of pieces of pixel data included in the rectangular image data, and generate the valid image data VIDT based on the pieces of selected valid pixel data. In other words, for example, the display driver IC 300 may selectively store, in a graphics memory (not shown), a plurality of pieces of valid pixel data corresponding to the valid image data VIDT among a plurality of pieces of pixel data of received image data, and restore the plurality of pieces of valid pixel data output from the graphics memory. The display driver IC 300 may drive the display panel 400 based on the valid image data VIDT.

As described above, the display system 1000 according to at least this example embodiment may drive the display panel 400 based on the valid image data VIDT corresponding to the valid display region 410.

When the display panel 400 is driven based on image data corresponding to a rectangular region RR including the valid display region 410 and regions that are not actually seen by a user, the display system 1000 may transmit or process not only valid pixel data, but also pixel data corresponding to the regions that are not actually seen by the user. Thus, the consumption of power of the display system 1000 may increase and/or operating efficiency thereof may decrease. Also, the resources of the memory or the graphics memory included in the display driver IC 300 may be wasted.

However, the display system 1000 according to at least this example embodiment may transmit or process only the valid pixel data corresponding to the valid image data VIDT by driving the display panel 400 based on the valid image data VIDT corresponding to the valid display region 410, thereby decreasing power consumption in the display system 1000 and/or increasing the operating efficiency thereof. The display system 1000 may thus more efficiently display an image. In at least one example, the display panel 400 may include a non-display region outside an outer perimeter of the valid display region 410. The shape of the display panel 400 may correspond to a shape of an outer perimeter of the non-display region, and the shape of the outer perimeter of the non-display region may be different (e.g., rectangular) from the shape of the outer perimeter of the valid display region 410 (e.g., non-rectangular).

Figure 3:
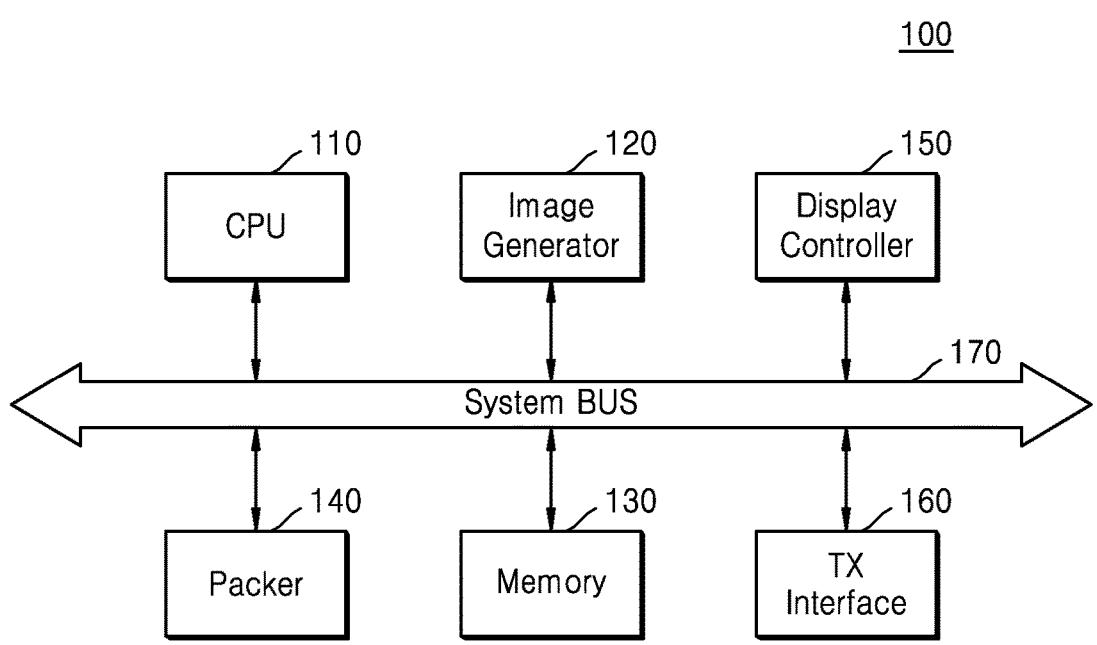
FIG. 3 is a schematic block diagram of a system processor according to an example embodiment.

FIG. 3 is a schematic block diagram of a system processor 100 according to an example embodiment. FIG. 3 illustrates one example embodiment of the system processor 100 of FIG. 1.

Referring to FIG. 3, the system processor 100 may include a central processing unit (CPU) 110, an image generator 120, a memory 130, a packer 140, a display controller 150, a transmitter (TX) interface 160, and a system bus 170. As an alternative to the example embodiment shown in FIG. 3, one or more of the image generator 120, the packer 140, and the display controller 150 may be included as part of the CPU 110, and thus, the CPU 110 may be configured to executed computer-readable instructions such that the CPU 110 is configured to perform the operations of one or more of the image generator 120, the packer 140 and the display controller 150.

The CPU 110 may control overall operations of the system processor 100. The CPU 110 may control operations of the above elements 120, 130, 140, 150, and 160. For example, the CPU 110 may control the image generator 120 to generate valid image data corresponding to the valid display region 410 of FIG. 1, based on screen information SINFO received from the display driver IC 300 of FIG. 1.

In at least one example embodiment, the CPU 110 may be embodied as a multi-core processor. A multi-core processor is one computing component including two or more independent cores.

The image generator 120 may perform operations related to graphics processing. In at least one example embodiment, the image generator 120 may generate image data corresponding to an image to be displayed on the display panel 400. The image generator 120 may generate valid image data corresponding to the valid display region 410 or rectangular image data including the valid image data.

In at least one example embodiment, the image generator 120 may include a graphic processing unit (GPU), a graphics accelerator, a display processor (DSP), etc. The image generator 120 may be embodied in software, hardware or a combination of software and hardware.

The memory 130 may store image data. The memory 130 may be also referred to as a frame buffer. In one example embodiment, the memory 130 may be a system memory of the system processor 100. The memory 130 may be embodied as a volatile memory or a nonvolatile memory. The volatile memory may include a dynamic random access memory (DRAM), a static random access memory (SRAM), a thyristor RAM (T-RAM), a zero capacitor RAM (Z-RAM), a twin transistor RAM (TTRAM), etc. The nonvolatile memory may include an electrically erasable programmable read-only memory (EEPROM), a flash memory, a magnetic RAM (MRAM), a phase change RAM (PRAM), a resistive RAM (ReRAM), etc.

Although FIG. 3 illustrates the memory 130 as being included in the system processor 100, example embodiments are not limited thereto and the memory 130 may be separately provided outside the system processor 100.

The packer 140 may pack valid pixel data. For example, the packer 140 may pack and write, to the memory 130, valid pixel data among pieces of pixel data of image data generated by the image generator 120 (e.g., valid image data or rectangular image data including the valid image data), based on screen information. As another example, the packer 140 may selectively output the valid pixel data from the memory 130.

Although FIG. 3 illustrates the packer 140 as an independent element, example embodiments are not limited thereto and the packer 140 may be included in another element 110, 120, 150, or 160.

The display controller 150 may output image data or updated image data to the display driver IC 300 of FIG. 1 under control of the CPU 110. In one example embodiment, the display controller 150 may output a plurality of pieces of valid pixel data corresponding to valid image data read from the memory 130. As another example, the display controller 150 may selectively read a plurality of pieces of valid pixel data from the memory 130 and output the plurality of pieces of read valid pixel data.

The transmitter interface 160 may convert a command signal and pixel data according to protocols of various interfaces, and exchange the converted command signal and pixel data with the display driver IC 300.

An interface applicable to the transmitter interface 160 may be, for example, an RGB interface, a CPU interface, a serial interface, a mobile display digital interface (MDDI), an inter integrated circuit (I2C) interface, a serial peripheral interface (SPI), a micro-controller unit (MCU) interface, a mobile industry processor interface (MIPI), a displayport (DP) interface, an embedded displayport (eDP) interface, a universal serial bus (USB), a high-definition multimedia interface (HDMI), etc. In addition, various other interfaces are applicable as an interface method of the transmitter interface 160.

The elements 110, 120, 130, 140, 150, and 160 of the system processor 100 may internally exchange data with one another via the system bus 170.

Figure 4:
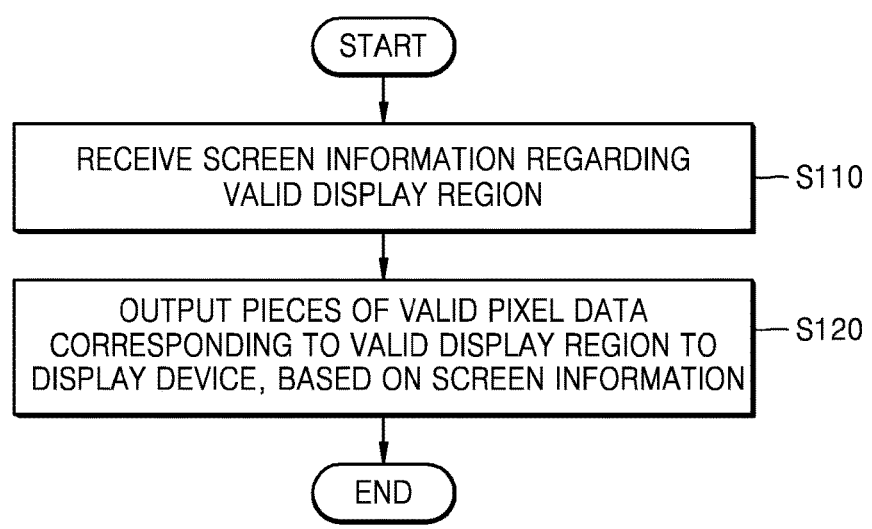
FIG. 4 is a flowchart illustrating a method of operating a system processor according to an example embodiment.

FIG. 4 is a flowchart illustrating a method of operating a system processor according to an example embodiment. FIG. 4 illustrates an example method of operating the system processor 100 illustrated in FIGS. 1 and 3.

Referring to FIG. 4, the system processor 100 may receive screen information regarding the valid display region 410 of the display panel 400 (operation S110). The receiving of the screen information may be performed at an initialization stage after power is supplied to the system processor 100, or at an initialization stage after the system processor 100 is reset. The valid display region 410 may have a non-rectangular shape. The screen information may include a starting position of the valid display region 410 and the number of pixels continuously arranged starting from the starting position of the valid display region 410 in each of a plurality of lines of the display panel 400. The plurality of lines may be horizontal or vertical lines of the display panel 400.

The system processor 100 may generate valid image data corresponding to the valid display region 410 based on the screen information, and output a plurality of pieces of valid pixel data included in the valid image data to the display device 200 and particularly to the display driver IC 300 (operation S120).

In one example embodiment, the system processor 100 may generate valid image data corresponding to the valid display region 410, pack and write the valid image data to the memory 130, and output valid pixel data read from the memory 130.

In another example embodiment, the system processor 100 may generate image data corresponding to a rectangular region including the valid display region 410, write the image data to the memory 130, and select and output valid pixel data from among the image data based on the screen information.

Figure 5:
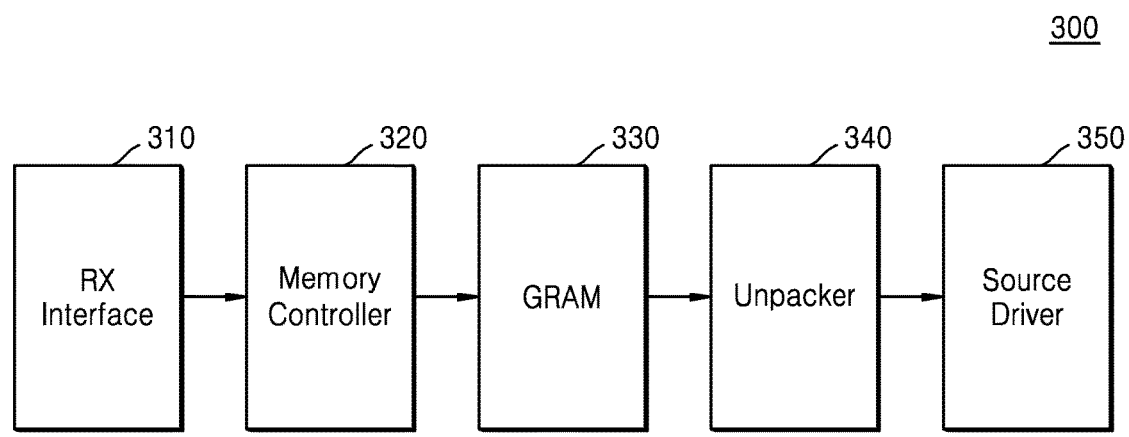
FIG. 5 is a schematic block diagram of a display driver integrated circuit (IC) according to an example embodiment.

FIG. 5 is a schematic block diagram of a display driver IC 300 according to an example embodiment. FIG. 5 illustrates one example embodiment of the display driver IC 300 of FIG. 1.

Referring to FIG. 5, the display driver IC 300 may include a receiver (RX) interface 310, a memory controller 320, a graphics memory (GRAM) 330, an unpacker 340, and a source driver 350. In one example embodiment, although not shown, the display driver IC 300 may further include an image processing circuit, a power generator, etc.

The receiver interface 310 may communicate with an external device (e.g., the system processor 100 of FIG. 1), and receive image data and a control signal from the system processor 100. The receiver interface 310 may communicate with the transmitter interface 160 of the system processor 100 according to the same or substantially the same interface method.

The memory controller 320 may control a write operation and a read operation of the GRAM 330. The memory controller 320 may control the GRAM 330 to store a plurality of pieces of valid pixel data received via the receiver interface 310. Also, the memory controller 320 may control the GRAM 330 to sequentially output the plurality of pieces of valid pixel data.

The GRAM 330 may store or output data under control of the memory controller 320. The GRAM 330 may be a frame memory configured to store at least one piece of frame image data.

The unpacker 340 may restore valid image data by unpacking the plurality of pieces of valid pixel data. The unpacking of the plurality of pieces of valid pixel data refers to arranging each of the plurality of pieces of valid pixel data, which are output in units of rows or columns, at a corresponding location on a valid display region. Thus, the valid image data corresponding to the valid display region may be generated.

In one example embodiment, the unpacker 340 may restore the valid image data by unpacking the plurality of pieces of valid pixel data output from the GRAM 330.

In another example embodiment, the unpacker 340 may restore the valid image data by unpacking valid pixel data received from the system processor 100, and control the memory controller 320 to store the valid image data in the GRAM 330. The unpacker 340 may be embodied as a part of the memory controller 320.

The source driver 350 may drive the display panel 400 of FIG. 1 based on transmitted valid image data. The source driver 350 may generate image signals corresponding to the valid image data and provide the image signals to the display panel 400.

Figure 6:
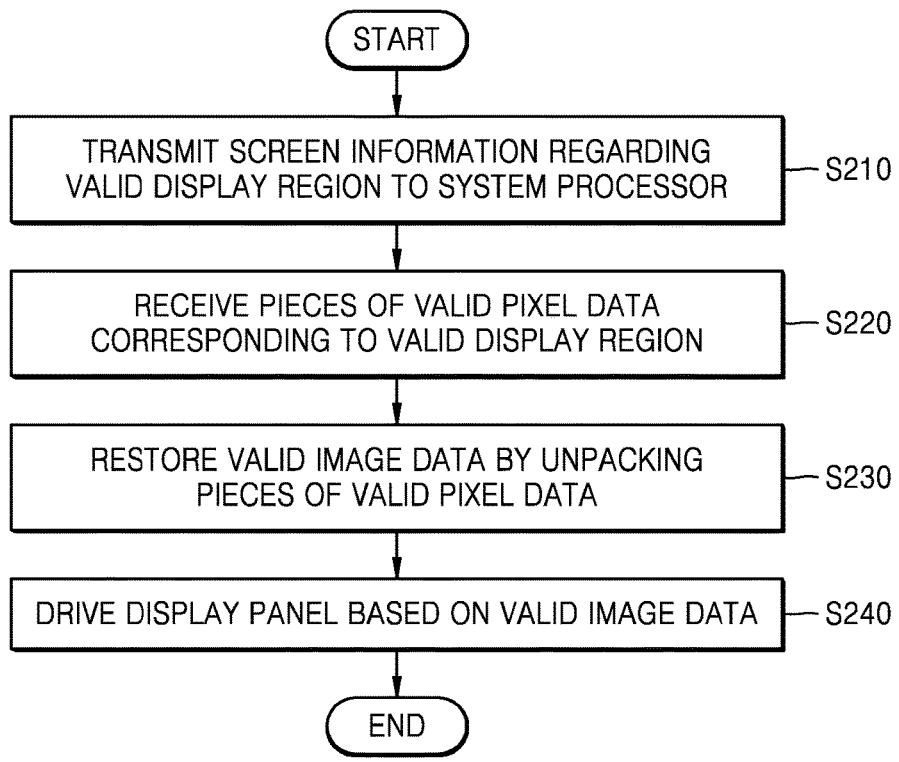
FIG. 6 is a flowchart illustrating a method of operating a display driver IC according to an example embodiment.

FIG. 6 is a flowchart illustrating a method of operating a display driver IC according to an example embodiment. FIG. 6 illustrates a method of operating the display driver IC 300 illustrated in FIGS. 1 and 5.

Referring to FIG. 6, the display driver IC 300 may transmit the screen information SINFO regarding the valid display region 410 of the display panel 400 to the system processor 100 (operation S210). The transmitting of the screen information SINFO may be performed at an initialization stage after power is supplied to the display driver IC 300 or at an initialization stage after the display driver IC 300 is reset. In one example embodiment, the display driver IC 300 may transmit the screen information SINFO to the system processor 100, in response to a request from the system processor 100.

Then, the display driver IC 300 may receive a plurality of pieces of valid pixel data corresponding to the valid display region 410 from the system processor 100 (operation S220). The display driver IC 300 may restore valid image data by unpacking the plurality of pieces of valid pixel data (operation S230). In at least one example embodiment, the display driver IC 300 may restore the valid image data by storing the plurality of pieces of valid pixel data in the GRAM 330 and unpacking the plurality of pieces of valid pixel data output from the GRAM 330. In another example embodiment, the display driver IC 300 may restore the valid image data by unpacking the plurality of pieces of received valid pixel data, and then store the restored valid image data in the GRAM 330.

The display driver IC 300 may drive the display panel 400 based on the valid image data (operation S240). The source driver 350 may generate image signals corresponding to the valid image data and provide the image signals to the display panel 400.

Figure 7A:
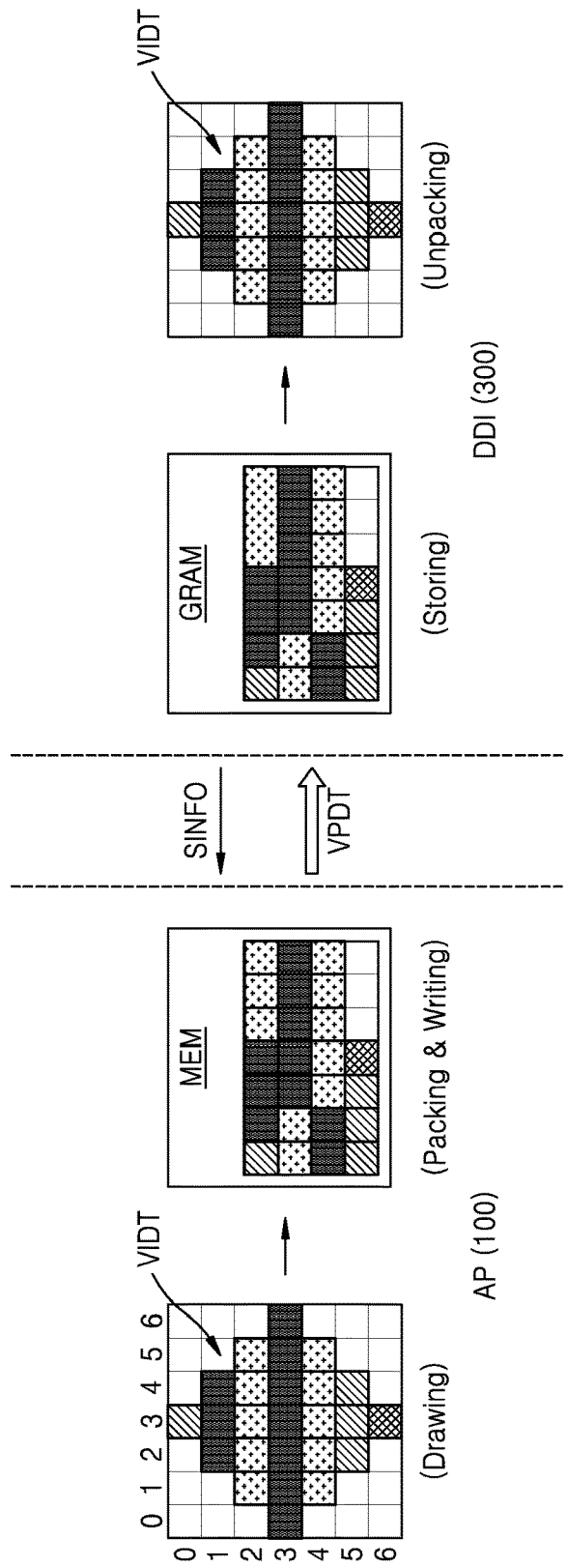
FIG. 7A is a conceptual diagram illustrating a method of operating a system processor and a display driver IC according to an example embodiment.

FIG. 7A is a conceptual diagram illustrating a method of operating a system (AP) 100 and a display driver IC (DDI) 300 according to an example embodiment. FIG. 7A illustrates a method of displaying an image in a valid display region of a display panel 400 illustrated in FIG. 7B.

Figure 7B:
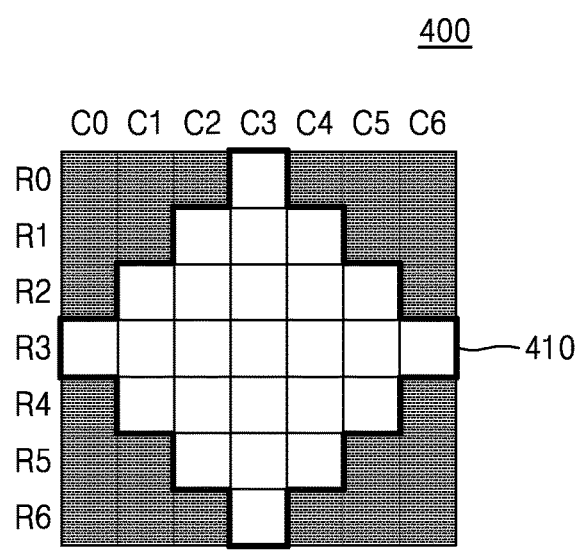
FIG. 7B is a diagram illustrating a display panel according to an example embodiment.

Referring to FIG. 7B, the display panel 400 may include a non-rectangular valid display region 410 displaying an image. As illustrated in FIG. 7B, it is assumed that the valid display region 410 has a diamond shape including twenty-five pixels included in seven vertical lines C0 to C6 and seven horizontal lines R0 to R7. The display panel 400 is illustrated as having a rectangular shape including the seven vertical lines C0 to C6 and the seven horizontal lines R0 to R7, but is not limited thereto. The display panel 400 may have any of various shapes. In at least one example embodiment, the display panel 400 may have the same or substantially the same shape as the valid display region 410 (e.g., a diamond shape).

Referring to FIG. 7A, the AP 100 may receive screen information SINFO regarding the valid display region 410 from the DDI 300. Then, the AP 100 may generate valid image data VIDT by drawing a valid image corresponding to the valid display region 410 based on the screen information SINFO.

The AP 100 may pack and write a plurality of pieces of valid pixel data VPDT constituting the valid image data VIDT to a memory MEM. Thus, as illustrated in FIG. 7A, valid pixel data corresponding to at least two horizontal lines may be written to at least one row or column of the memory MEM. The AP 100 may write the plurality of pieces of valid pixel data to the memory MEM in units of a given (or, alternatively, desired or preset) number of pixels. For example, as illustrated in FIG. 7A, seven pieces of valid pixel data may be written to one row of the memory MEM, and twenty-five pieces of valid pixel data may be sequentially written to four rows of the memory MEM.

The AP 100 may sequentially read the plurality of pieces of valid pixel data VPDT from the memory MEM and transmit the plurality of pieces of read valid pixel data VPDT to the DDI 300.

The DDI 300 may sequentially store the plurality of pieces of valid pixel data VPDT in a GRAM. The DDI 300 may store the plurality of pieces of valid pixel data in the GRAM in units of a given (or, alternatively, desired or preset) number of pixels. FIG. 7A illustrates that a number of pieces of valid pixel data written to one row of the memory MEM of the AP 100 and a number of pieces of valid pixel data written to the GRAM of the DDI 300 are the same, but example embodiments are not limited thereto. For example, nine pieces of valid pixel data may be stored in one row of the GRAM.

The DDI 300 may restore the valid image data VIDT by reading the plurality of pieces of valid pixel data from the GRAM and unpacking the plurality of pieces of valid pixel data. In this case, the DDI 300 may restore the valid image data VIDT in a horizontal line by reading a plurality of pieces of valid pixel data corresponding to the horizontal line of the valid image data VIDT from the GRAM and arranging the plurality of pieces of read valid pixel data at corresponding positions on the horizontal line. The DDI 300 may drive the display panel 400 based on the valid image data VIDT. An image signal corresponding to the valid image data VIDT may be displayed on the valid display region 410.

Figure 8A:
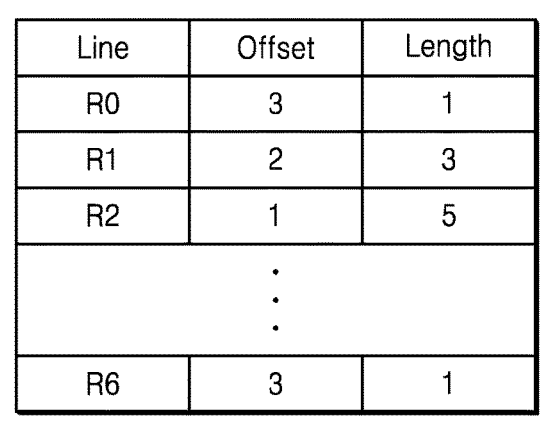

FIGS. 8A and 8B are diagrams illustrating example screen information according to example embodiments.

Referring to FIGS. 8A and 8B, the screen information may include a starting position of each of valid pixels constituting the valid display region 410 and the number of valid pixels arranged continuously from the starting position, in each of horizontal or vertical lines of the display panel (400 of FIG. 1).

FIG. 8A illustrates example screen information SINFO of the valid display region 410 of FIG. 7B according to an example embodiment.

Referring to FIG. 8A, the screen information SINFO may include offsets and pixel lengths in units of horizontal or vertical lines of the display panel 400. The offsets represent starting positions of valid pixels included in the valid display region 410 in each of the horizontal or vertical lines. The pixel lengths each represent the number of pixels arranged continuously starting from one of the starting positions.

FIG. 8B illustrates example screen information SINFO of a valid display region, which has a heart or ring shape and which is discontinuous in the same horizontal or vertical line. For example, when the valid display region has a ring shape, valid pixels may be discontinuously arranged in a horizontal line in a central region of the valid display region. The screen information SINFO may include at least one offset and at least one pixel length in each of the horizontal lines. For example, in a second horizontal line R1, valid pixels may be continuously arranged, and three valid pixels arranged starting from a second column may be included in the valid display region. In a third horizontal line R3, discontinuously arranged valid pixels may be included, and two valid pixels arranged starting from a first column and two valid pixels arranged starting from a fourth column may be included in the valid display region.

Examples of the screen information SINFO have been described above with reference to FIGS. 8A and 8B. However, inventive concepts are not limited thereto, and the screen information SINFO may further include other types of information and may be embodied in different forms.

Figure 9:
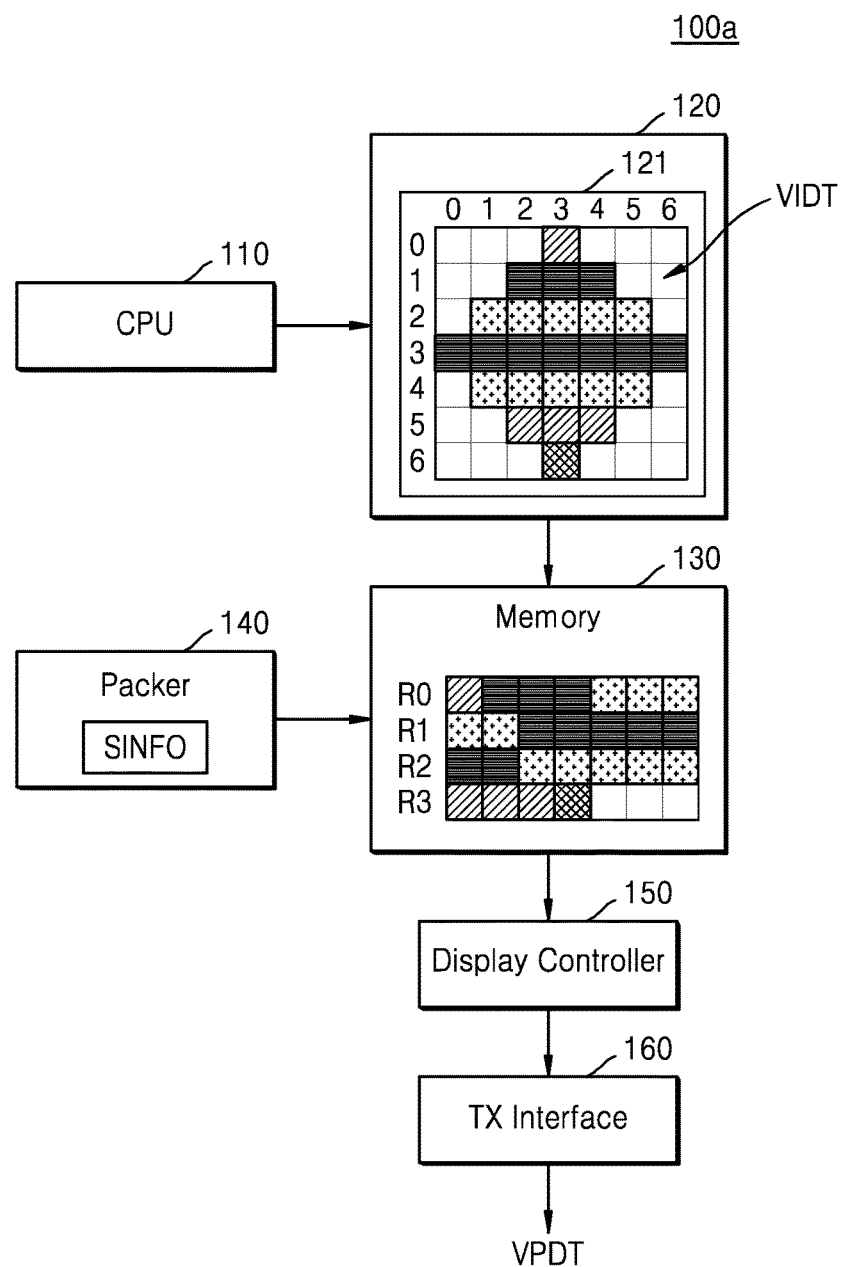
FIG. 9 is a conceptual diagram illustrating a method of operating a system processor according to an example embodiment.

FIG. 9 is a conceptual diagram illustrating a method of operating a system processor 100a according to an example embodiment. FIG. 9 illustrates an operation of the system processor 100 of FIG. 7A in more detail.

Referring to FIG. 9, an image generator 120 may generate valid image data VIDT under control of a CPU 110. In one example embodiment, the image generator 120 may generate the valid image data VIDT based on screen information SINFO. In another example embodiment, the image generator 120 may generate rectangular image data including the valid image data VIDT. The image generator 120 may generate the valid image data VIDT by drawing a valid image corresponding to a valid display region in a rectangular virtual memory 121 therein.

A packer 140 may pack and write a plurality of pieces of valid pixel data VPDT constituting the valid image data VIDT to a memory 130, based on the screen information SINFO. Thus, the plurality of pieces of valid pixel data VPDT may be sequentially written to the memory 130. A display controller 150 may read the plurality of pieces of valid pixel data from the memory 130, and may output the plurality of pieces of valid pixel data VPDT via a transmitter interface 160.

Figure 10:
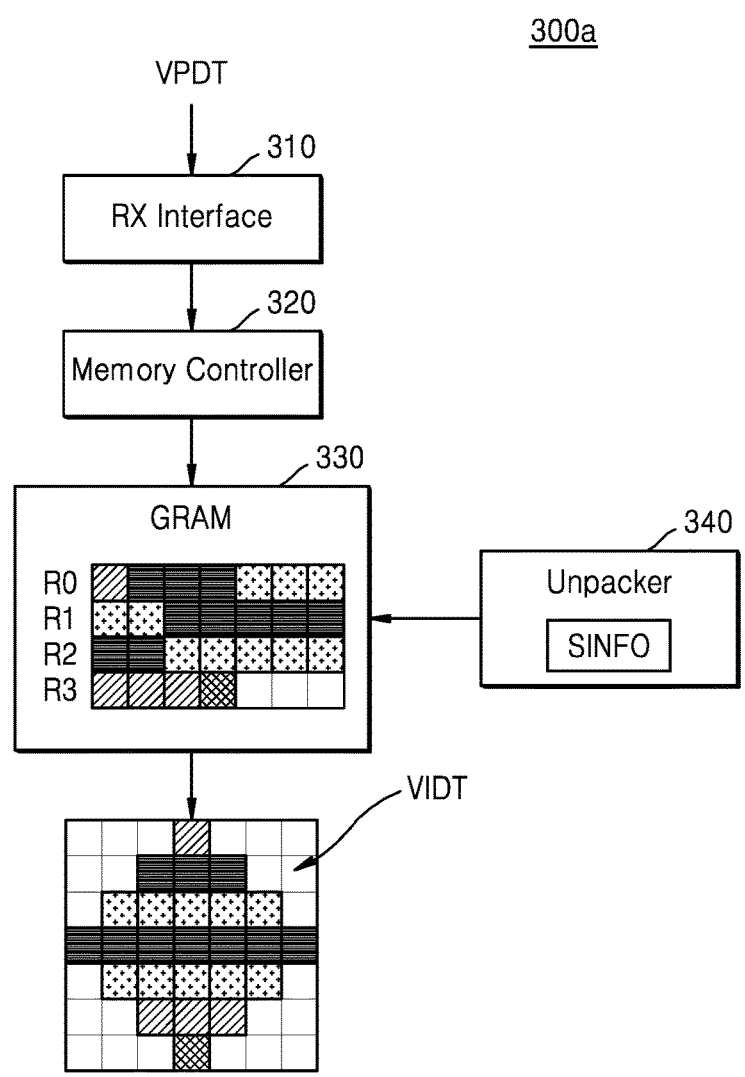
FIG. 10 is a conceptual diagram illustrating a method of operating a display driver IC according to an example embodiment.

FIG. 10 is a conceptual diagram illustrating a method of operating a display driver IC 300a according to an example embodiment. FIG. 10 illustrates an operation of the display driver IC 300 of FIG. 7A in more detail.

Referring to FIG. 10, a receiver interface 310 may receive a plurality of pieces of valid pixel data VPDT from a system processor (100a of FIG. 9), and a memory controller 320 may store the plurality of pieces of valid pixel data VPDT in a GRAM 330. The memory controller 320 may sequentially store the plurality of pieces of valid pixel data VPDT in the GRAM 330 in the order in which the plurality of pieces of valid pixel data VPDT are received. The plurality of pieces of valid pixel data VPDT may be continuously stored in the GRAM 330.

An unpacker 340 may restore the valid image data VIDT by unpacking the plurality of pieces of valid pixel data VPDT read from the GRAM 330 based on screen information SINFO. In other words, for example, the unpacker 340 may restore the valid image data VIDT by rearranging a plurality of pieces of packed valid pixel data to correspond to a valid display region (410 of FIG. 1). The display driver IC 300a may convert the valid image data VIDT into image signals in units of horizontal lines and provide the image signals to a display panel.

Figure 11:
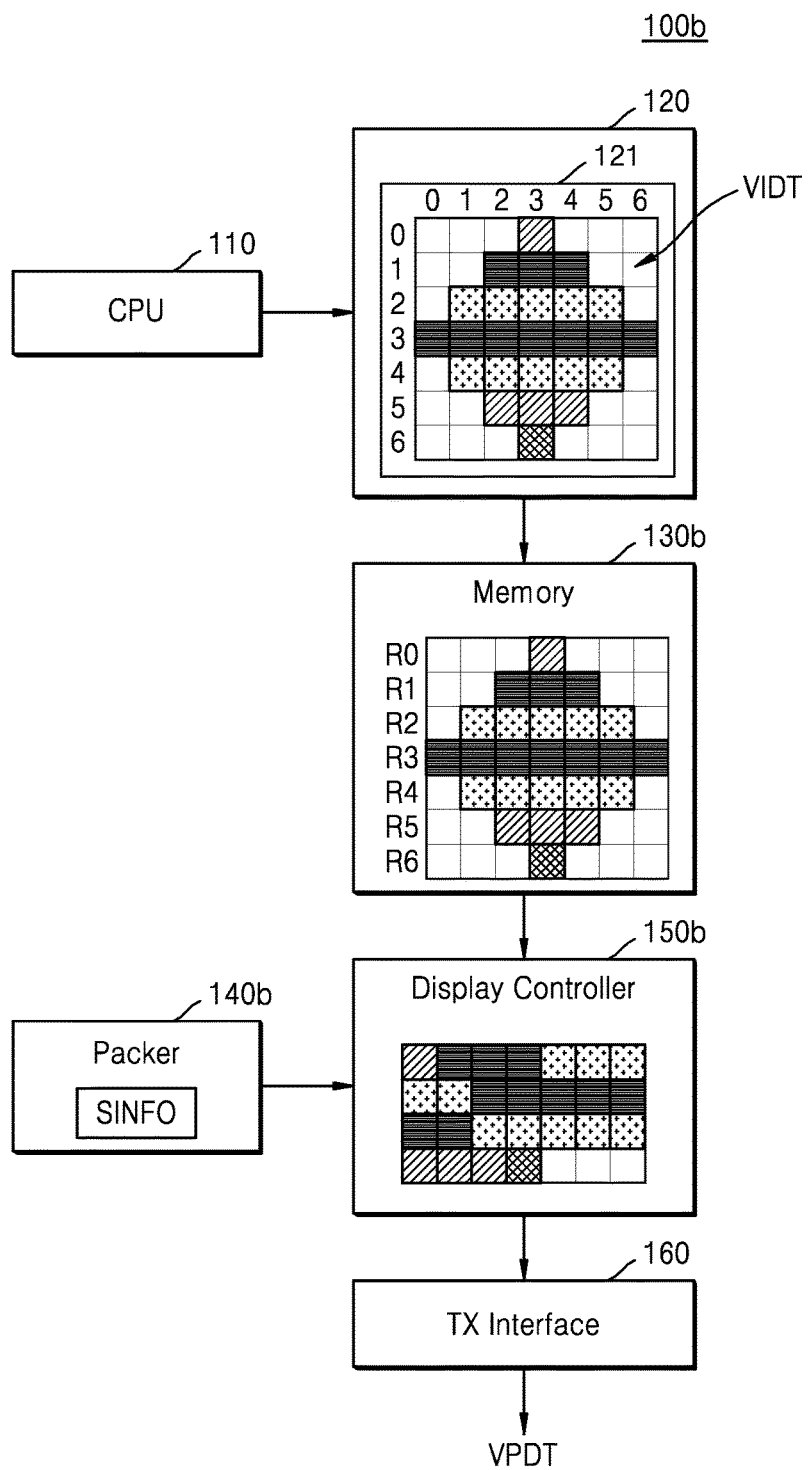
FIG. 11 is a conceptual diagram illustrating a method of operating a system processor according to an example embodiment.

FIG. 11 is a conceptual diagram illustrating a method of operating a system processor 100b according to another example embodiment.

Referring to FIG. 11, an image generator 120 may generate rectangular image data including valid image data VIDT and write the rectangular image data to a memory 130b, under control of a CPU 110. Thus, a plurality of pieces of pixel data constituting the rectangular image data may be stored in the memory 130b according to positions of the plurality of pieces of pixel data in the rectangular image data. The memory 130b may store image data including a plurality of pieces of pixel data corresponding to seven horizontal lines and seven vertical lines in storage regions arranged in a matrix of seven rows and seven columns.

A display controller 150b may read a plurality of pieces of valid pixel data VPDT among the plurality of pieces of pixel data written to the memory 130b. In this case, the display controller 150a may read the plurality of pieces of valid pixel data VPDT by reading pixel data stored at corresponding positions on a valid display region based on screen information SINFO, under control of a packer 140b. In at least one example embodiment, the display controller 150b may pack the plurality of pieces of read valid pixel data VPDT. In other words, for example, the display controller 150b may sequentially and continuously arrange the plurality of pieces of valid pixel data VPDT.

The display controller 150b may output the plurality of pieces of valid pixel data VPDT via a transmitter interface 160. The plurality of pieces of valid pixel data VPDT may be transmitted to a display driver IC (300b of FIG. 12) in the order in which the plurality of pieces of valid pixel data VPDT are arranged.

Figure 12:
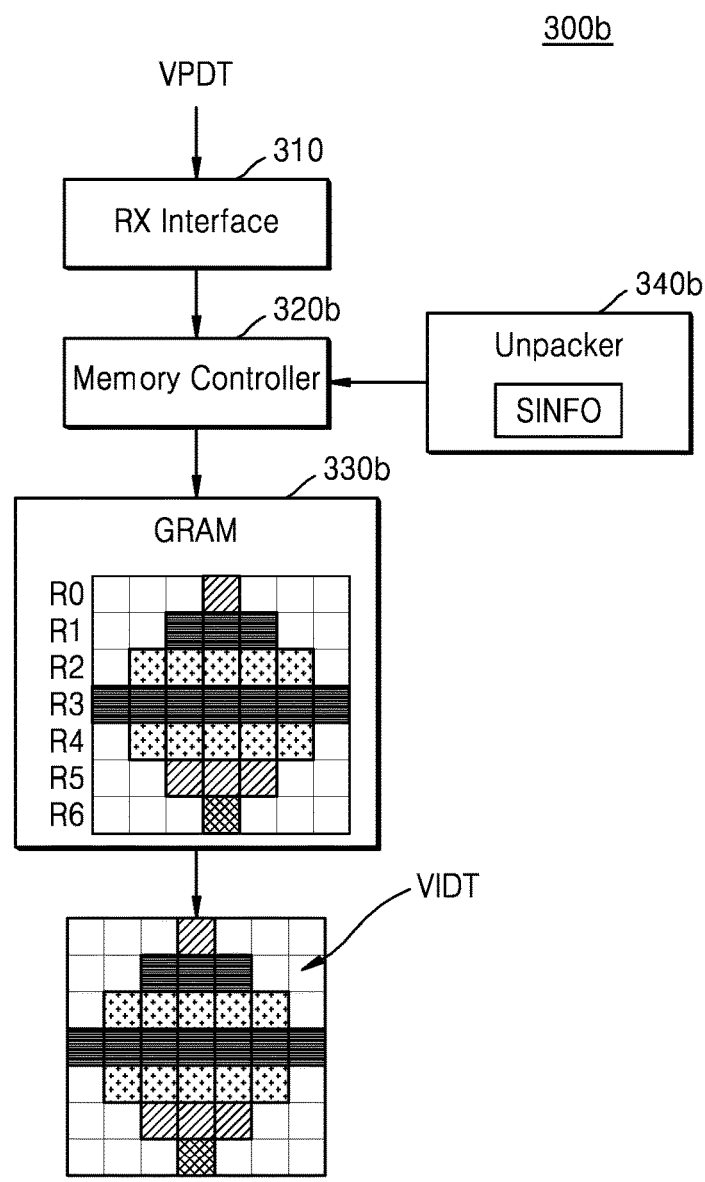
FIG. 12 is a conceptual diagram illustrating a method of operating a display driver IC according to an example embodiment.

FIG. 12 is a conceptual diagram illustrating a method of operating a display driver IC 300b according to an example embodiment.

Referring to FIG. 12, a receiver interface 310 may receive a plurality of pieces of valid pixel data VPDT from a system processor (100b of FIG. 11), and a memory controller 320b may store the plurality of pieces of valid pixel data VPDT in a GRAM 330b. In this case, the memory controller 320b may rearrange the plurality of pieces of valid pixel data VPDT to correspond to a valid display region (not shown) based on screen information SINFO and write the plurality of pieces of rearranged valid pixel data VPDT to the GRAM 330b, under control of an unpacker 340b. In other words, for example, the memory controller 320b may restore valid image data VIDT by unpacking the plurality of pieces of valid pixel data VPDT, and store the valid image data VIDT in the GRAM 330b.

Thereafter, the memory controller 320b may output a plurality of pieces of pixel data from the GRAM 330b in units of rows. At least some of the plurality of pieces of pixel data may include the valid pixel data VPDT. The display driver IC 300b may convert the output plurality of pieces of pixel data into image signals and provide the image signals to a display panel (400 of FIG. 1).

Figure 13:
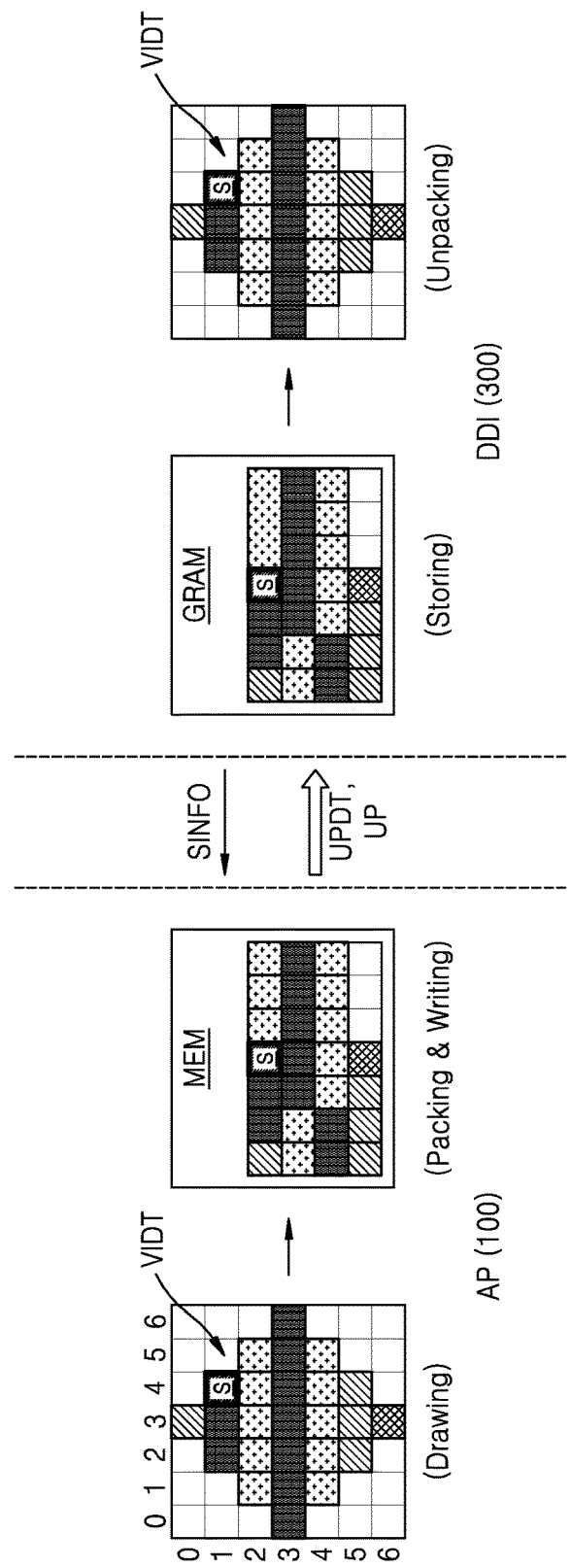
FIG. 13 is a conceptual diagram illustrating a method of operating a system processor and a display driver IC according to an example embodiment.

FIG. 13 is a conceptual diagram illustrating a method of operating a system processor and a display driver IC according to an example embodiment. FIG. 13 illustrates a method of operating a system processor and a display driver IC during a partial update operation of updating a portion of an image displayed on a display panel.

Referring to FIG. 13, an AP 100 may update a portion of valid image data VIDT. In other words, for example, the image generator 120 of FIG. 3 may generate a portion of valid image data corresponding to a portion of a valid display region to be updated. The AP 100 may write valid pixel data S included in the portion of the valid image data to a corresponding location on a memory MEM. The AP 100 may transmit, to a DDI 300, valid pixel data UPDT(S) to be updated (hereinafter referred to as 'update pixel data UPDT(S)') and location information of a pixel to be updated (update location information UP).

The display driver IC 300 may store the valid pixel data UPDT(S) in a corresponding storage region of a GRAM, based on the update location information UP. In at least one example embodiment, the DDI 300 may write the update pixel data UPDT(S) to a storage region of the GRAM corresponding to the location of a pixel to be updated, based on mapping data mapping address information of the GRAM to location information of a valid display region of the display panel and the received update location information UP.

The display driver IC 300 may restore the valid image data VIDT by unpacking a plurality of pieces of pixel data output from the GRAM, and display an image on the valid display region of the display panel based on the valid image data VIDT. In this case, only some of valid pixel data included in the GRAM is updated, and thus, a portion of the image displayed on the valid display region may be updated.

Figure 14A:
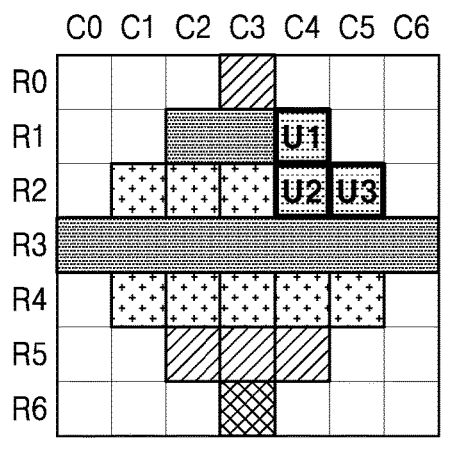
Figure 14B:
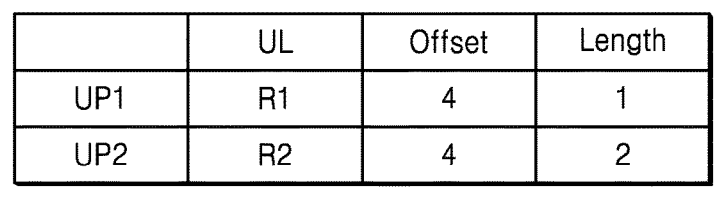

FIG. 14A illustrates example pixels to be partially updated in a valid display region. FIG. 14B illustrates location information of pixels to be updated.

When valid pixels U1, U2, and U3 illustrated in FIG. 14A are updated to new image signals during a partial update operation, a system processor (100 of FIG. 1) may transmit update location information UP illustrated in FIG. 14B to a display driver IC (300 of FIG. 1).

Referring to FIG. 14B, the update location information UP may include information regarding vertical or horizontal lines UL to be updated, offsets, and pixel lengths. The offsets represent starting positions of valid pixels to be updated in the horizontal or vertical lines UL to be updated. The pixel lengths represent the numbers of pixels updated continuously starting from the starting positions.

For example, as illustrated in FIG. 14A, when the valid pixel U1 corresponding to a sixth column C5 of a second row R1 and the valid pixels U2 and U3 corresponding to a fifth column C5 and a seventh column C6 of a third row R2 are updated, the update location information UP may include first location information UP1 and second location information UP2 illustrated in FIG. 14B. The first location information UP1 may represent that one pixel is updated starting from a fifth pixel arranged in the second row R1. The second location information UP may represent that two pixels are updated starting from a fifth pixel arranged in the third row R2.

Figure 15:
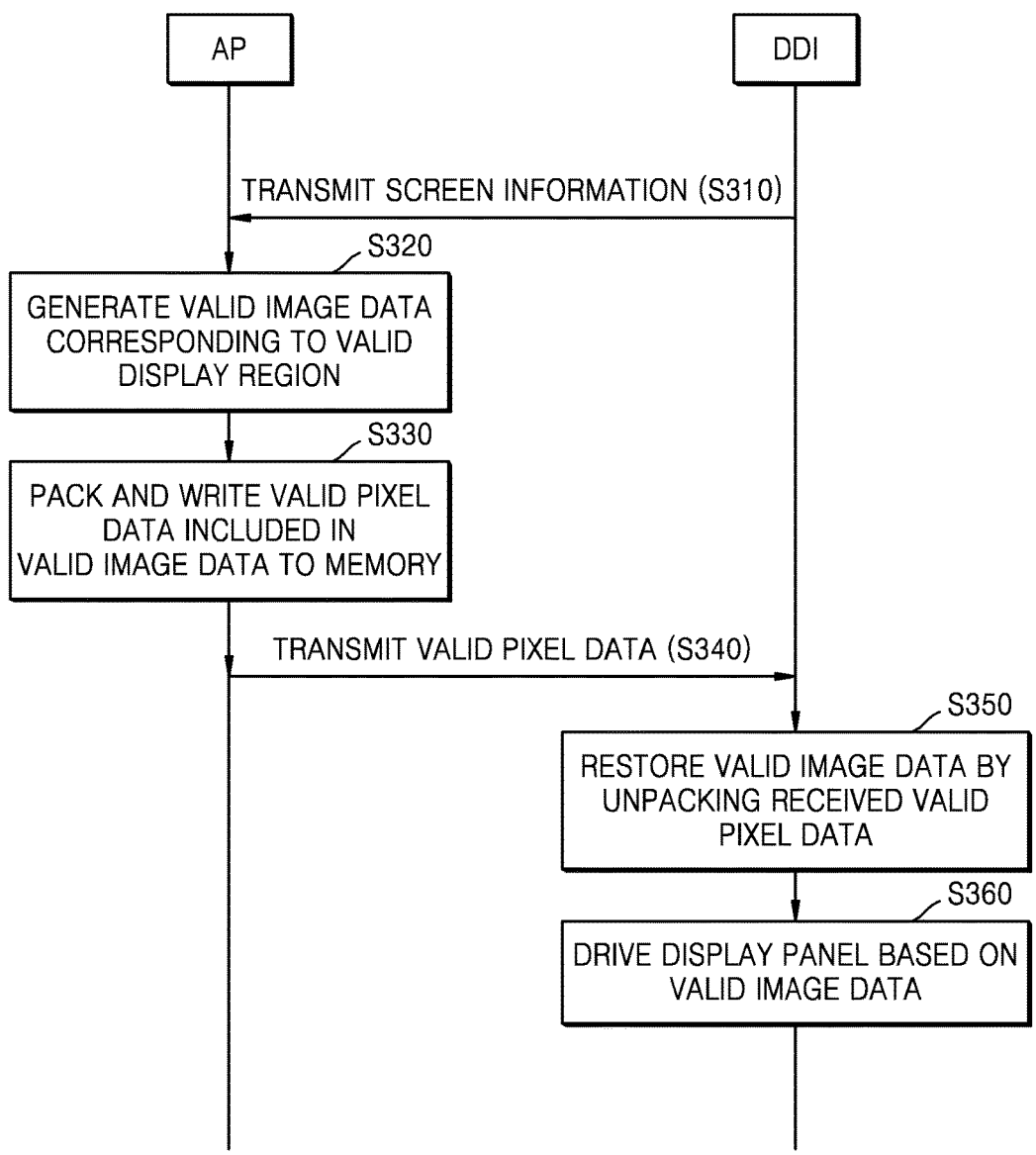
FIG. 15 is a signal flow diagram illustrating a method of operating a display system according to an example embodiment.

FIG. 15 is a signal flow diagram illustrating a method of operating a display system according to an example embodiment. FIG. 15 illustrates a method of operating a system processor AP and a display driver IC DDI during an example of normal operation of a display system.

Referring to FIG. 15, during an initialization section (or interval or period), the display driver IC DDI may transmit information regarding a valid display region of a display panel (e.g., screen information SINFO) to the system processor AP (operation S310). The valid display region may have a non-rectangular shape. The screen information SINFO may include a starting point of a valid display region and the number of pixels arranged continuously in each of horizontal or vertical lines of the display panel. The display driver IC DDI may be initialized during the initialization section, e.g., a stabilization section (or interval or period) after power is supplied to the display system 1000 of FIG. 1 including the display driver IC 300 and the system processor 100 or a stabilization section after the display system 1000 is reset. In this case, the display driver IC DDI may transmit the screen information SINFO to the system processor AP.

The system processor AP may generate valid image data corresponding to the valid display region (operation S320). In at least one example embodiment, the system processor AP may generate the valid image data based on the screen information SINFO. In another example embodiment, the system processor AP may generate image data corresponding to a rectangular region including a valid display region. The image data may include valid image data, and invalid image data that is not actually seen.

The system processor AP may pack and write valid pixel data included in the valid image data to a memory (e.g., the memory 130 of FIG. 3) (operation S330). In at least one example embodiment, the system processor AP may pack and write a plurality of pieces of valid pixel data constituting the valid image data to the memory. In another example embodiment, the system processor AP may select valid pixel data from among image data corresponding to a rectangular region and pack and write the valid pixel data to the memory, based on the screen information SINFO.

The system processor AP may read a plurality of pieces of valid pixel data from the memory and transmit the plurality of pieces of valid pixel data to the display driver IC DDI (operation S340).

The display driver IC DDI may restore the valid image data by unpacking the plurality of pieces of received valid pixel data (operation S350). In other words, for example, the display driver IC DDI may rearrange the plurality of pieces of valid pixel data to correspond to the valid display region. The display driver IC DDI may sequentially store the plurality of pieces of received valid pixel data in a graphics memory. Thereafter, in a display section, the display driver IC DDI may read the plurality of pieces of valid pixel data from the graphics memory and rearrange the plurality of pieces of read valid pixel data to correspond to the valid display region.

The display driver IC DDI may drive the display panel based on the valid image data (operation S360). The valid image data includes valid pixel data regarding pixels included in the valid display region. Thus, the display driver IC DDI may provide image signals to the valid display region.

Figure 16:
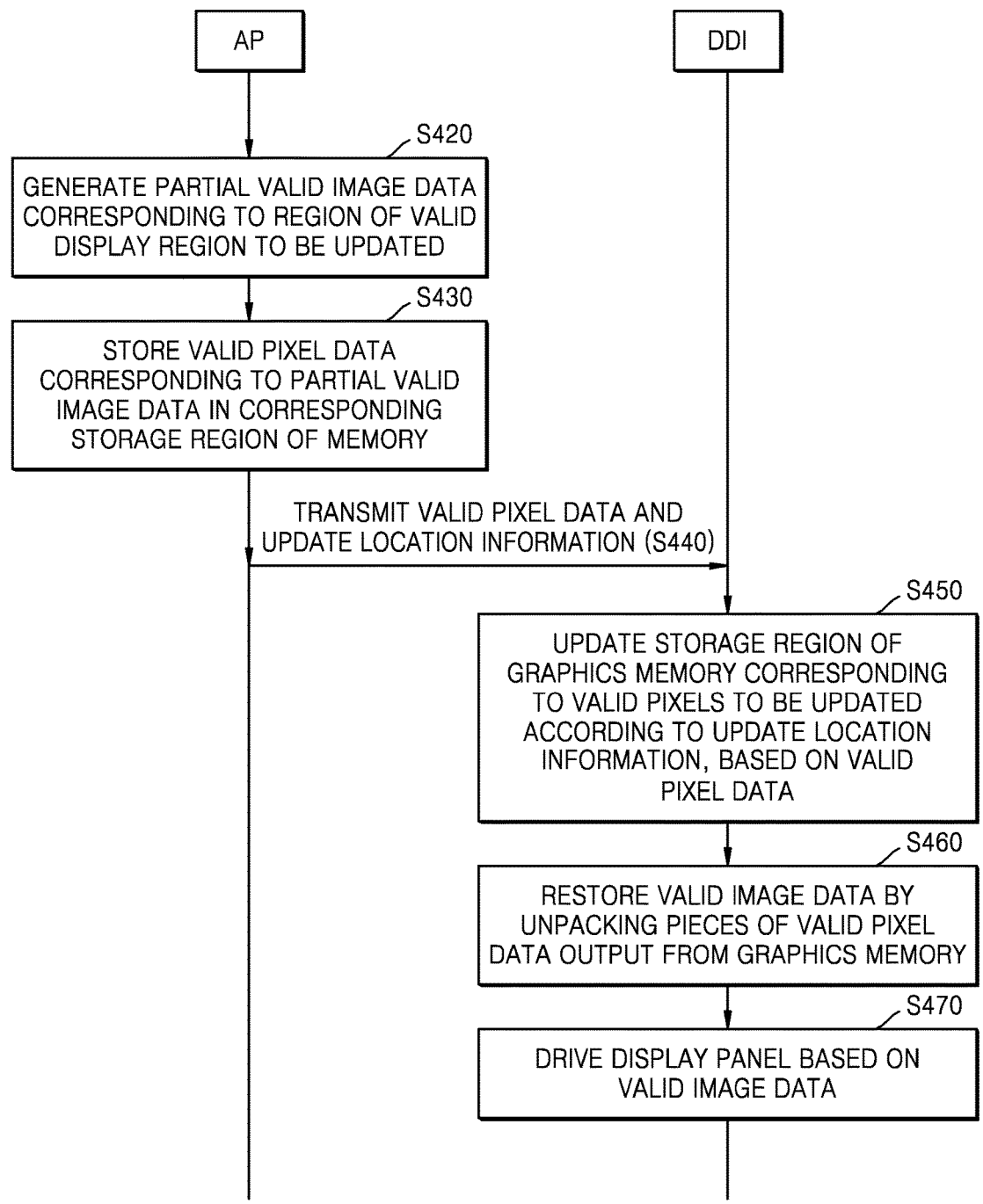
FIG. 16 is a signal flow diagram illustrating a method of operating a display system according to an example embodiment.

FIG. 16 is a signal flow diagram illustrating a method of operating a display system according to an example embodiment. FIG. 16 illustrates a method of operating a system processor AP and a display driver IC DDI during a display partial update operation of the display system. The method of FIG. 16 may be performed after the method of operating a display system illustrated in FIG. 15.

Referring to FIG. 16, the system processor AP may generate a portion of valid image data corresponding to a region of a valid display region to be updated based on screen information SINFO (operation S420).

The system processor AP may store valid pixel data constituting the portion of the valid image data (e.g., update pixel data) in a corresponding storage region of a memory (operation S430). Then, the system processor AP may transmit the update pixel data and update location information to the display driver IC DDI (operation S440). The update location information represents location information of valid pixels to be updated in the valid display region.

The display driver IC DDI may update a storage region of a graphics memory corresponding to the valid pixels to be updated according to the update location information, based on the valid pixel data (e.g., update pixel data) (operation S450). In other words, for example, the display driver IC DDI may update a portion of image data by writing update pixel data to a corresponding location on the graphics memory according to the update location information.

Thereafter, the display driver IC DDI may restore the valid image data by unpacking the plurality of pieces of valid pixel data output from the graphics memory (operation S460), and drive a display panel (e.g., 400 of FIG. 1) based on the valid image data (operation S470).

Figure 17:
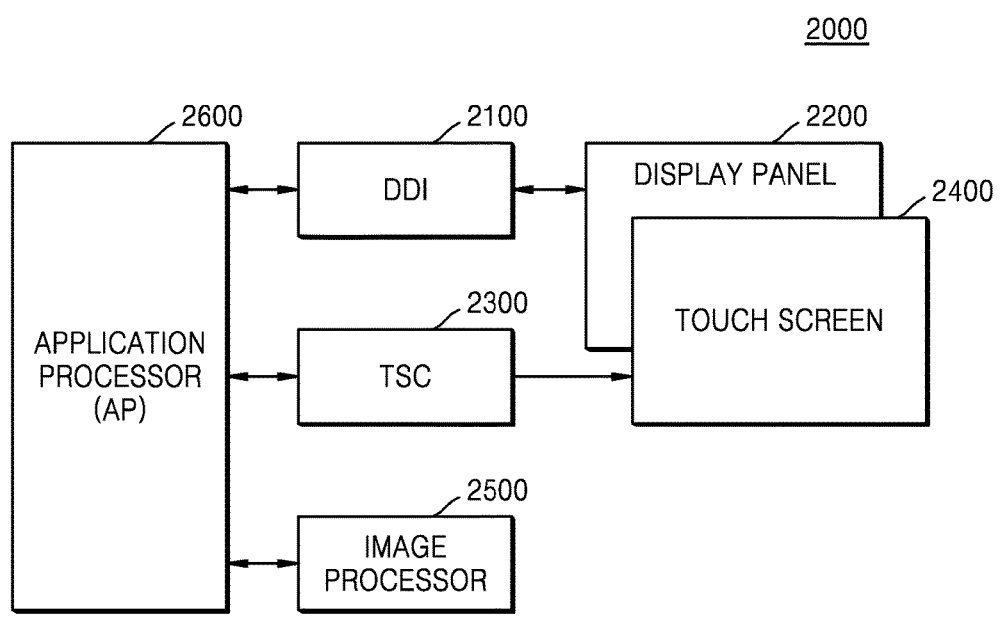
FIG. 17 is a block diagram of a touch screen system including a display system according to an example embodiment.

FIG. 17 is a block diagram of a touch screen system 2000 including a display system according to an example embodiment.

Referring to FIG. 17, the touch screen system 2000 may include an application processor (AP) 2600, a display driver IC (DDI) 2100, a display panel 2200, a touch screen controller 2300, a touch screen 2400, and an image processor 2500.

The AP 2600 may receive data and/or instructions from a user, and control the DDI 2100 and the touch screen controller 2300 based on the received data and/or instructions. The AP 2600 may be embodied as a graphics card, a system-on-chip (SoC), or the like.

As described above with reference to FIGS. 1 to 16, the AP 2600 may provide the DDI 2100 with valid pixel data corresponding to a valid display region of the display panel 2200.

The image processor 2500 may process image data. The image processor 2500 may generate image data to be provided to the DDI 2100 or process the image data based on a touch signal provided from the touch screen controller 2300. The image processor 2500 may generate valid image data corresponding to the valid display region. In at least one example embodiment, the image processor 2500 may be included in the AP 2600.

The DDI 2100 may drive the display panel 2200 under control of the AP 2600. The DDI 2100 may receive valid pixel data included in valid image data from the AP 2600 or the image processor 2500 and drive the display panel 2200 based on the valid pixel data.

The display panel 2200 may include a non-rectangular screen (the valid display region) and display an image signal received from the DDI 2100 via the valid display region.

The touch screen controller 2500 may be connected to the touch screen 2400 to receive sense data from the touch screen 2400 and provide the sense data to the AP 2600.

The touch screen 2400 may overlap the display panel 2200. In at least one example embodiment, the touch screen 2400 may be integrally provided with the display panel 2200. The touch screen 2400 may have the same or substantially the same shape as the valid display region of the display panel 2200.

In at least one example embodiment, the DDI 2100 and the touch screen controller 2500 may share a plurality of functional blocks, and may be embodied as one semiconductor chip.

Figure 18:
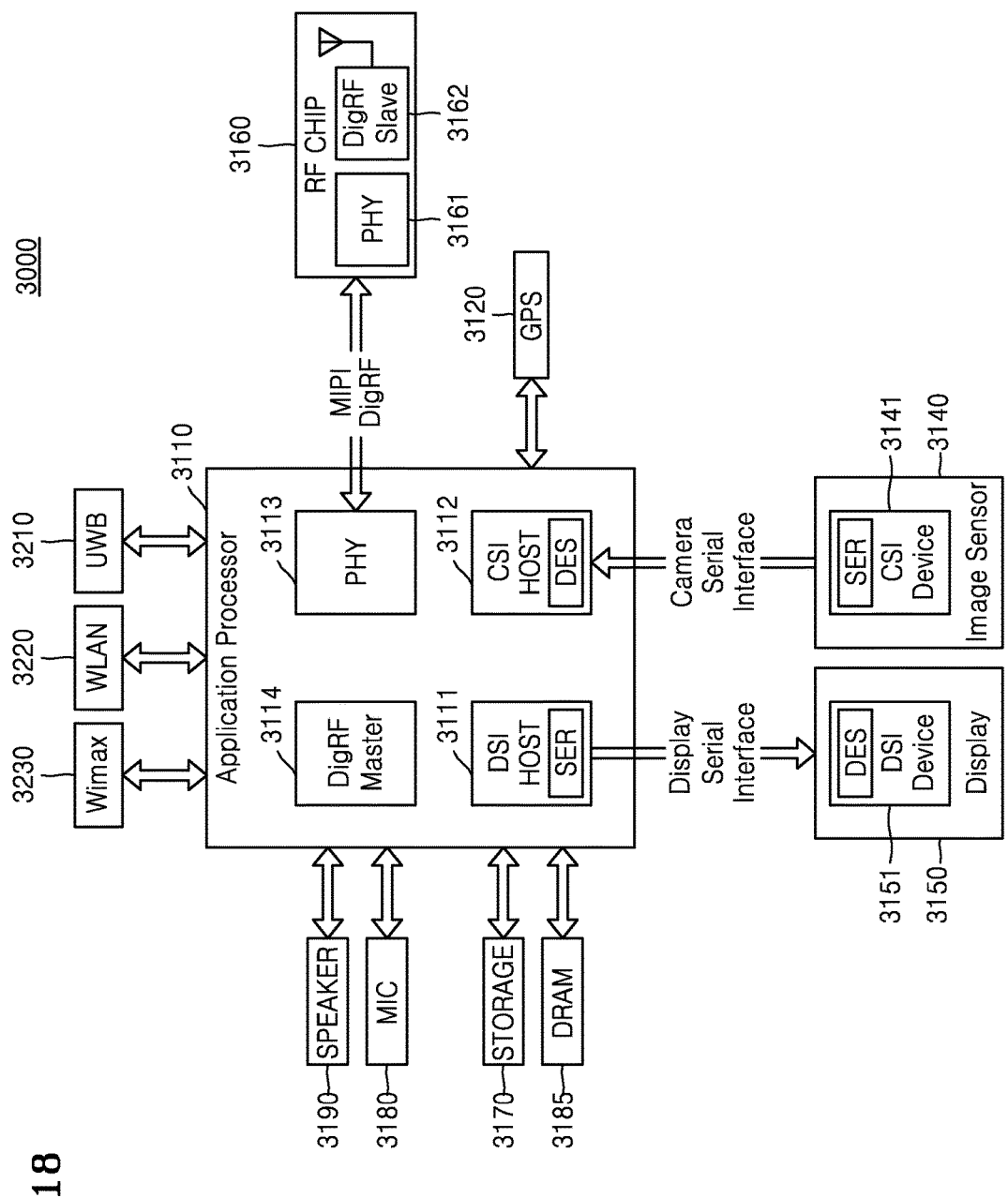
FIG. 18 is a block diagram of an electronic system according to an example embodiment.

FIG. 18 is a block diagram of an electronic system 300 according to an example embodiment.

Referring to FIG. 18, the electronic system 3000 may be embodied as a data processing device capable of using or supporting an MIPI interface, e.g., a mobile phone, a personal digital assistant (PDA), a portable multimedia player (PMP), a smart phone, or the like.

The electronic system 3000 may include an application processor 3110, an image sensor 3140, and a display device 4150. The display device 3150 may be the same or substantially the same as the example embodiment of the display device 200 of FIG. 2.

A camera serial interface (CSI) host 3112 included in the application processor 3110 may establish serial communication with a CSI device 3141 of the image sensor 3140 through a CSI. In this case, an optical deserializer DES may be included in the CSI host 3112 and an optical serializer SER may be included in the CSI device 3141.

A display serial interface (DSI) host 3111 included in the application processor 3110 may establish serial communication with a DSI device 3151 of the display device 3150 through a DSI. The DSI host 3111 may be the same or substantially the same as the example embodiment of the system processor 100 of FIG. 1. In this case, the DSI host 3111 may process valid pixel data corresponding to a valid display region of the display device 3150 and transmit the valid pixel data to the DSI 3151. The valid pixel data corresponding to the valid display region, which is actually seen by a user, among pixel data may be processed and transmitted to decrease power consumption in the DSI host 3111 and data transmission latency. Thus, the overall performance of the DSI host 3111 may be improved.

The electronic system 3000 may further include a radio-frequency (RF) chip 3160 for communicating with the application processor 3110. A physical layer PHY 3113 of the electronic system 3100 and a physical layer PHY 3161 of the RF chip 3160 may exchange data with each other according to a MIPI DigRF interface.

The electronic system 3000 may further include a global positioning system (GPS) 3120, a storage unit 3170, a microphone 3180, a dynamic random access memory (DRAM) 3185, and a speaker 3190. The electronic system 3000 may establish communication using WiMAX 3230, a wireless local area network (WLAN) 3220, ultra wideband (UWB) 3210, etc.

Figure 19:
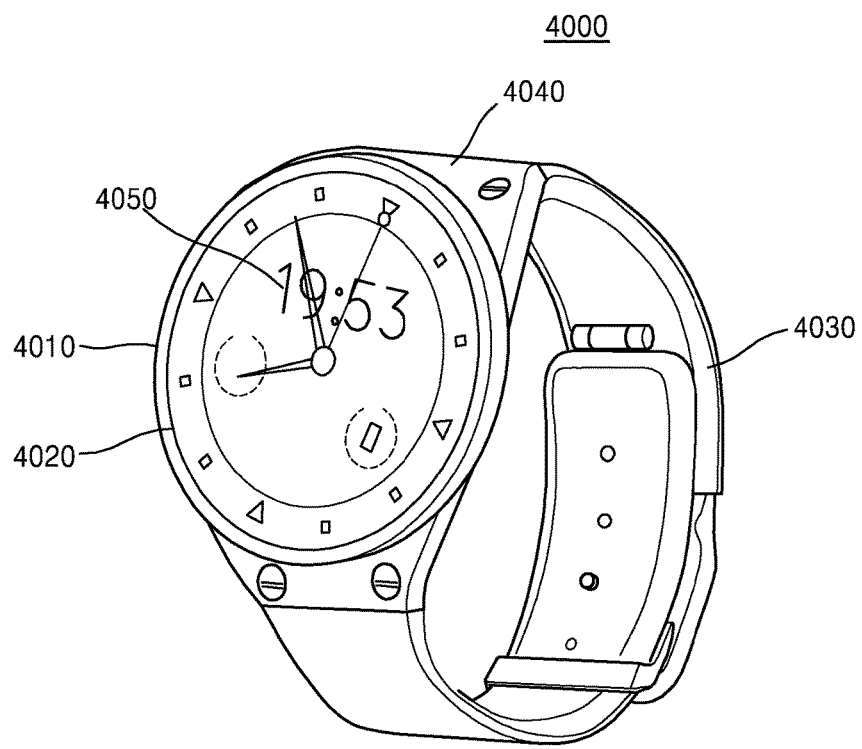
FIG. 19 is a diagram illustrating the exterior of an electronic device according to an example embodiment.

FIG. 19 is a diagram illustrating an example exterior of an electronic device 4000 according to an example embodiment.

Referring to FIG. 19, the electronic device 4000 may include a display panel 4010, a package 4040, and a supporter 4030.

The display panel 4010 may include a screen 4020 on which an image is displayed. An image 4050 may be displayed on the screen 4020. The screen 4020 may have any of various shapes. Although FIG. 19 illustrates the screen 4020 having a round shape, example embodiments are not limited thereto. The screen 4020 may have a non-rectangular shape. For example, the screen 4020 may be provided in various shapes, e.g., a ring shape, an oval shape, an N-polygonal shape ('N' denotes an integer which is equal to or greater than '3'), a flat tire shape, etc.

The display panel 4010 may be mounted on the package 4040. The package 4040 may be coupled to the supporter 4030. The package 4040 may be attached to a desired object through the support unit 4030. For example, the support unit 4030 may be a wrist band.

Although not shown, the electronic device 4000 may include an application processor and a display driver IC. As described above with reference to FIGS. 1 to 16, the application processor and the display driver IC process and transmit valid pixel data corresponding to valid pixels included in the screen 4020, but do not process and transmit pixel data that is not actually used. Thus, power consumption in the electronic device 4000 may decrease and the display performance thereof may be improved.

While inventive concepts have been particularly shown and described with reference to various example embodiments thereof, it will be understood that various changes in form and details may be made therein without departing from the principles and spirit of inventive concepts. Accordingly, the scope of inventive concepts should not limited to these example embodiments, and may be defined by the claims and their equivalents.

What is claimed is:

1. A method of operating an application processor to control a display device including a valid display region to display a non-rectangular shape, a border of the non-rectangular shape being displayed with rectangular pixels, the method comprising:
receiving screen information associated with the valid display region; and
outputting a plurality of pieces of valid pixel data, the plurality of pieces of valid pixel data selected based on the screen information and corresponding to the valid display region of the display device, wherein the outputting a plurality of pieces of valid pixel data includes,
packing the plurality of pieces of valid pixel data,
writing the packed plurality of pieces of valid pixel data to a memory, and
outputting the packed plurality of pieces of valid pixel data from the memory to the display device.

2. The method of claim 1, wherein the screen information includes a starting position of the valid display region and a number of pixels arranged continuously from the starting position in each of a plurality of lines of a display panel of the display device, the plurality of lines being horizontal or vertical lines.

3. The method of claim 1, wherein
the valid display region includes at least two lines;
each of the at least two lines includes a different number of valid pixels; and
the at least two lines are horizontal or vertical lines.

4. The method of claim 1, wherein the writing the packed plurality of pieces of valid pixel data to a memory comprises:
writing, from among the packed plurality of pieces of valid pixel data, valid pixel data corresponding to at least two lines of the valid display region to at least one row or column of the memory, the at least two lines being horizontal or vertical lines of the valid display region.

5. The method of claim 1, wherein the packing the plurality of pieces of valid pixel data comprises:
arranging the plurality of pieces of valid pixel data into units, each of the units including pixel data corresponding to a plurality of pixels.

6. The method of claim 1, wherein
the writing writes a first number of the packed plurality of pieces of valid pixel data to the memory; and
the outputting outputs the first number of the packed plurality of pieces of valid pixel data to the display device.

7. The method of claim 1, wherein the outputting a plurality of pieces of valid pixel data comprises:
generating rectangular image data;
storing the rectangular image data in the memory;
selectively reading, based on the screen information, the plurality of pieces of valid pixel data from among the rectangular image data stored in the memory, the plurality of pieces of valid pixel data corresponding to the valid display region; and outputting the packed and selectively read plurality of pieces of valid pixel data to the display device.

8. The method of claim 1, further comprising:
identifying valid pixel data corresponding to a portion of the valid display region to be updated; and
outputting the identified valid pixel data and location information of the portion of the valid display region to the display device.

9. A display system comprising:
a display panel configured to display an image having a non-rectangular shape in a valid display region, a border of the non-rectangular shape being displayed with rectangular pixels;
an application processor configured to execute computer readable instructions such that the application processor is configured to
receive screen information associated with the valid display region,
pack a plurality of pieces of valid pixel data, the plurality of pieces of valid pixel data corresponding to valid image data to be displayed in the valid display region, and the valid image data based on the screen information, and
output the packed plurality of pieces of valid pixel data; and
a display driver circuit configured to
restore the valid image data by unpacking the packed plurality of pieces of valid pixel data received from the application processor, and
drive the display panel based on the restored valid image data.

10. The display system of claim 9, wherein the application processor is configured to execute the computer readable instructions such that the application processor is further configured to
generate the valid image data based on the screen information; and
write the packed plurality of pieces of valid pixel data to a memory.

11. The display system of claim 9, further comprising:
a memory; and wherein
the application processor is configured to execute the computer readable instructions such that the application processor is further configured to write the packed plurality of pieces of valid pixel data to the memory.

12. The display system of claim 9, wherein the display driver circuit comprises:
a graphics memory configured to store the packed plurality of pieces of valid pixel data; and wherein
the display driver circuit is further configured to rearrange the packed plurality of pieces of valid pixel data to correspond to the valid display region.

13. The display system of claim 9, wherein the application processor is configured to execute the computer readable instructions such that the application processor is further configured to
identify valid pixel data corresponding to a portion of the valid display region to be updated; and
output the identified valid pixel data and location information of the portion of the valid display region to the display driver circuit.

14. The display system of claim 9, wherein the non-rectangular shape includes one of a round shape, an oval shape, an N-polygonal shape, and a curved shape, wherein N denotes an integer which is greater than or equal to 3.

15. A display system comprising:
a display panel having a display region configured to display at least one image having a non-rectangular shape, a border of the non-rectangular shape being displayed with rectangular pixels; and
a display driver integrated circuit configured to drive the display panel based on packed valid pixel data corresponding to only a portion of a rectangular-shaped image, the portion of the rectangular-shaped image having the same non-rectangular shape as the display region.

16. The display system of claim 15, wherein the display driver integrated circuit is further configured to
output screen information indicative of the non-rectangular shape; and
receive the packed valid pixel data in response to the screen information.

17. The display system of claim 16, further comprising:
a memory storing computer readable instructions; and
processing circuitry configured to execute the computer readable instructions such that the processing circuitry is configured to
generate the packed valid pixel data based on the screen information; and
output the packed valid pixel data to the display driver integrated circuit.

18. The display system of claim 17, wherein the processing circuitry is configured to
sequentially arrange a plurality of pieces of valid pixel data into the packed valid pixel data.

19. The display system of claim 16, wherein the screen information identifies a portion of the display panel as the display region.

20. The display system of claim 15, wherein the display driver integrated circuit is further configured to
receive the packed valid pixel data;
generate valid image data by rearranging the packed valid pixel data; and
output the valid image data to drive the display panel.

* * * * *